US012091909B1

(12) United States Patent
Miller et al.

(10) Patent No.: US 12,091,909 B1
(45) Date of Patent: Sep. 17, 2024

(54) SECURITY DOOR SYSTEM

(71) Applicant: Qualitas Manufacturing Incorporated, Itasca, IL (US)

(72) Inventors: James V. Miller, Glen Ellyn, IL (US); Tyler Hinckley, Elk Grove Village, IL (US); Jacob Robert Cimino, Glen Ellyn, IL (US); Craig Zarbeck, Stevensville, MI (US); Scott Ross, Carol Stream, IL (US)

(73) Assignee: Qualitas Manufacturing Incorporated, Itasca, IL (US)

( * ) Notice: Subject to any disclaimer, the term of this patent is extended or adjusted under 35 U.S.C. 154(b) by 174 days.

(21) Appl. No.: 17/472,142

(22) Filed: Sep. 10, 2021

Related U.S. Application Data

(60) Provisional application No. 63/077,421, filed on Sep. 11, 2020.

(51) Int. Cl.
*E06B 5/11* (2006.01)
*E06B 3/70* (2006.01)
*E06B 9/15* (2006.01)

(52) U.S. Cl.
CPC .............. *E06B 5/11* (2013.01); *E06B 3/7015* (2013.01); *E06B 9/15* (2013.01); *E06B 2009/1505* (2013.01)

(58) Field of Classification Search
CPC . E06B 3/7015; E06B 5/11; E06B 9/15; E06B 2009/1505; E06B 9/01; E06B 9/02; E05C 9/006; E05C 9/008; E05C 9/02; E05C 9/025; E05C 9/04; E05C 9/042
See application file for complete search history.

(56) References Cited

U.S. PATENT DOCUMENTS

| | | | | |
|---|---|---|---|---|
| 91,342 | A | 6/1869 | Ireland | |
| 6,047,999 | A * | 4/2000 | Dixon, Jr. | E05B 63/18 292/42 |
| 8,550,506 | B2 * | 10/2013 | Nakanishi | E05C 9/04 292/DIG. 21 |
| 2004/0189012 | A1 * | 9/2004 | Katou | B60R 7/06 292/34 |
| 2010/0013244 | A1 * | 1/2010 | Shimizu | E05B 83/30 292/34 |

(Continued)

FOREIGN PATENT DOCUMENTS

| | | | |
|---|---|---|---|
| EP | 1669536 | A1 | 6/2006 |
| FR | 3023572 | A1 | 1/2016 |
| GB | 2404215 | B | 4/2007 |

(Continued)

OTHER PUBLICATIONS

PROFILMAR Catalog (2018).

*Primary Examiner* — William V Gilbert
(74) *Attorney, Agent, or Firm* — Ice Miller LLP

(57) ABSTRACT

A security device for reinforcing a structure such as a door against cutting or other forms of attack, comprises a hollow casing with an interior space, and first and second rod assemblies positioned in the interior space under compression. The first rod assembly comprises a first rod and a first spring, and the second rod assembly comprises a second rod and a second spring. The first and second rod assemblies are parallel, and the first and second springs do not overlap. The first and second rods only have point contact with the casing.

11 Claims, 13 Drawing Sheets

(56) References Cited

U.S. PATENT DOCUMENTS

| | | | | |
|---|---|---|---|---|
| 2021/0324667 | A1* | 10/2021 | Grillo | E05C 19/003 |
| 2022/0112748 | A1* | 4/2022 | Guillemette | E05C 9/185 |

FOREIGN PATENT DOCUMENTS

| | | | |
|---|---|---|---|
| JP | 380890 | | 8/1991 |
| JP | 5305064 | B2 | 9/2009 |
| WO | 2004104354 | A1 | 12/2004 |

* cited by examiner

SECURITY DOOR SYSTEM

This application claims the benefit of U.S. Provisional Application No. 63/077,421, filed on Sep. 11, 2020, which is hereby incorporated by reference in its entirety.

BACKGROUND OF THE INVENTION

The present invention relates to security systems for preventing forced entry of doors and other structures and, in particular, to cut-resistant security systems.

Residential and non-residential burglaries cost billions of dollars in property losses each year. The majority of burglary offenses involve forcible entry or attempted forcible entry. Common methods of forced entry include cutting, prying and drilling. In particular, power cutting tools have increased the risk and vulnerability to break-ins. Modern grinders, reciprocating saws, and circular saws are battery operated, lightweight and easily portable, and are relatively inexpensive and readily available. Such tools are designed to cut through any material, including metal and concrete, and can quickly and easily compromise conventional security doors, security cabinets, safes and other reinforced structures.

Commercial doors are commonly reinforced with steel plates or bars. However, such passive security devices may not be sufficient to protect against power cutting tools. Active anti-cut security devices include compression bar systems, which generally comprise a metal rod that is placed under longitudinal compression by a spring positioned at the end of the rod. The rod and spring are secured within a casing that prevents the lateral movement of the components and maintains the compression of the rod. When the rod is cut transversely, the spring forces the cut ends of the rod together against the sides of the blade to act as a clamp and arrest further movement of the blade (e.g., similar to the operation of a disc brake). When the blade is withdrawn, the spring forces the cut ends of the rod back together to heal the cut, which allows the compression bar to resist multiple cutting attempts.

Compression bar systems have potential weaknesses. For example, modern high-speed cutting tools can generate frictional heat that approaches the melting temperature of metal, and can inadvertently weld the casing to the compression rod. Once the compression rod is welded to the casing, the spring can no longer force the cut ends of the rod together to clamp the cutting blade or heal the cut. In addition, the compression bar system may be vulnerable to cutting through the spring. Therefore, it would be desirable to develop active security systems that can protect against modern cutting tools.

SUMMARY OF THE INVENTION

In an embodiment, a security device comprises a hollow casing having an interior space with a longitudinal axis. A plurality of rods and a plurality springs are positioned in the interior space, including first and second rods and first and second springs. The first rod extends parallel to the longitudinal axis, the first spring is positioned to exert compressive force on the first rod in a direction parallel to the longitudinal axis, the second rod is positioned parallel to the first rod, and the second spring is positioned to exert compressive force on the second rod in a direction parallel to the longitudinal axis. The plurality of springs does not include two springs that overlap with respect to a plane perpendicular to the longitudinal axis. In an embodiment, the interior space has an inner surface, the first rod has a polygonal cross-section with first polygon vertices, and the second rod has a polygonal cross-section with second polygon vertices. The first rod contacts the inner surface only at the first polygon vertices, and the second rod contacts the inner surface only at the second polygon vertices. In an embodiment, the interior space comprises first and second lobes that form an inner surface having a cross-section defined by two overlapping circles. The first rod and first spring are positioned in the first lobe, and the second rod and second spring are positioned the second lobe.

In one embodiment, a security system for a door comprises first and second security bars coupled to the door. The first security bar comprises a hollow first casing having a first interior space with a first longitudinal axis. A first rod and a first spring are positioned in the first interior space, the first rod extending parallel to the first longitudinal axis, and the first spring positioned to exert compressive force on the first rod in a direction parallel to the first longitudinal axis. The second security bar comprises a hollow second casing having a second interior space with a second longitudinal axis. A second rod and a second spring are positioned in the second interior space, the second rod extending parallel to the second longitudinal axis, and the second spring positioned to exert compressive force on the second rod in a direction parallel to the second longitudinal axis. The first and second longitudinal axes are substantially horizontal to the door, and the first and second springs do not overlap with respect to a plane vertical to the door. In an embodiment, the door is hollow and has a door interior space. The first and second security bars are positioned in the door interior space. In an embodiment, the security system further comprises first and second brackets coupled to the door and extending into the door interior space. The first security bar is positioned in the door interior space on the first bracket, and second security bar is positioned in the door interior space on the second bracket.

In one embodiment, a security system for a door comprises first and second security bars, and a hinge bracket coupled to the door. The door has inner and outer sides, and a first end hingedly coupled to a frame. The door has a closed position wherein the door is disposed in the frame with a first space between the first end and the frame. The first security bar comprises a hollow first casing having a first interior space with a first longitudinal axis. A first rod and a first spring are positioned in the first interior space, the first rod extending parallel to the first longitudinal axis, and the first spring positioned to exert compressive force on the first rod in a direction parallel to the first longitudinal axis. The second security bar comprises a hollow second casing having a second interior space with a second longitudinal axis. A second rod and a second spring are positioned in the second interior space, the second rod extending parallel to the second longitudinal axis, and the second spring positioned to exert compressive force on the second rod in a direction parallel to the second longitudinal axis. The first and second longitudinal axes are substantially horizontal to the door, and the first and second springs do not overlap with respect to a plane vertical to the door. The door has inner and outer sides, and a first end hingedly coupled to a frame, the door having a closed position wherein the door is disposed in the frame with a first space between the first end and the frame. The hinge bracket comprises a frame leaf and a door leaf rotatably coupled by a pin. The frame leaf is secured to the frame, and the door leaf is secured to the first end of the door. The hinge bracket extends across the first space. In an embodiment, the door leaf extends from the first end to the inner side of the door. In an embodiment, the door leaf conforms to the first end and inner side of the door. In an embodiment, the security system further comprises a first plate secured to the inner side of the door.

In one embodiment, a security system comprises a rolling door and a security bar. The rolling door comprises a slat having a body with an inner and outer side. The body includes a channel opening toward the inner side. The security bar is sized and shaped to fit within the channel, and comprises a hollow casing having an interior space with a longitudinal axis. A plurality of rods and a plurality springs are positioned in the interior space, including first and second rods and first and second springs. The first rod extends parallel to the longitudinal axis, the first spring is positioned to exert compressive force on the first rod in a direction parallel to the longitudinal axis, the second rod is positioned parallel to the first rod, and the second spring is positioned to exert compressive force on the second rod in a direction parallel to the longitudinal axis. The plurality of springs does not include two springs that overlap with respect to a plane perpendicular to the longitudinal axis.

DETAILED DESCRIPTION OF THE INVENTION

Figure 1A:
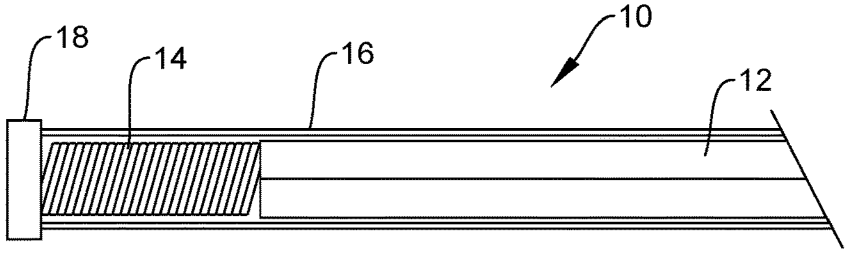
FIG. 1A is a partial side section view of a compression bar.

Referring to FIGS. 1-4, embodiments of a compression bar security device are shown that are configured to minimize the contact between the surfaces of the compression rod and casing, thereby reducing the susceptibility to inadvertent welding caused by high-speed cutting tools. FIGS. 1A and 1B show an embodiment of a compression bar 10. FIG. 1A only shows one end of compression bar 10, the opposite end being a mirror image. Compression bar 10 comprises a rod 12 and springs 14 at either end of the rod, that are positioned within a hollow casing or tube 16. End caps 18 are positioned at either end of tube 16 to retain rod 12 and springs 14 within the tube. The length of tube 16 is shorter than the combined length of rod 12 and relaxed or free length of springs 14, such that the springs are compressed and are positioned to exert a longitudinal compressive force on the ends of the rod.

Figure 1B:
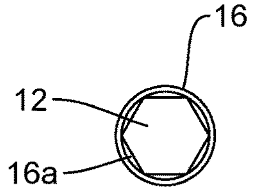
FIG. 1B is an end elevation view of the compression bar of FIG. 1A.

As best shown in FIG. 1B, rod 12 and tube 16 have different shapes such that, when viewed in cross-section, the rod only makes point contact with the inner surface of the walls of the tube. In one embodiment, rod 12 has a hexagonal cross-section, and the walls of tube 16 form an interior space 16*a* with a circular cross-section that is sized and shaped to receive the rod. Hexagonal rod 12 only contacts the circular inner surface of the walls of tube 16 at the vertices, and is otherwise spaced apart from the tube. Those of skill in the art will appreciate that interior space 16*a* and/or rod 12 may have other shapes that have only point contact. For example, rod 12 may have a polygonal cross-section that contacts the inner surface of a hollow casing at the polygon vertices.

Figure 2A:
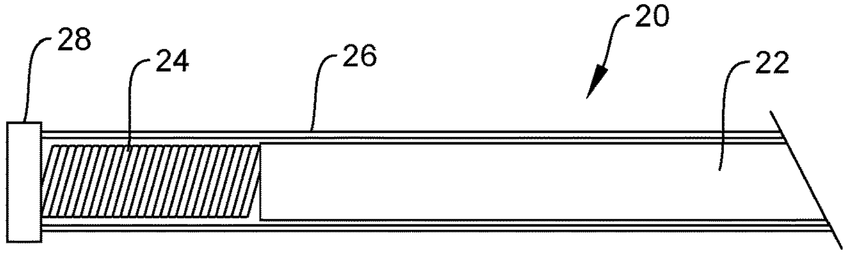
FIG. 2A is a partial side section view of an alternative embodiment of a compression bar.
Figure 2B:
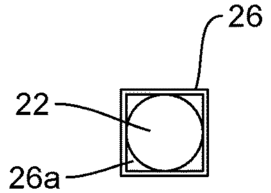
FIG. 2B is an end elevation view of the compression bar of FIG. 2A.

FIGS. 2A and 2B show an alternative embodiment of compression bar 20 comprising a rod 22, springs 24, a tube 26, and end caps 28 that are assembled in the same configuration as compression bar 10. As best shown in FIG. 2B, rod 12 and tube 16 have different shapes such that, when viewed in cross-section, the rod only has point contact with the walls of the tube. Rod 22 has a circular cross-section, and the walls of tube 26 have an inner surface that forms an interior space 26*a* with a square cross-section that is sized and shaped to receive the rod. Circular rod 22 only has tangential contact with the square walls of tube 26, and is otherwise spaced apart from the tube.

Figure 3A:
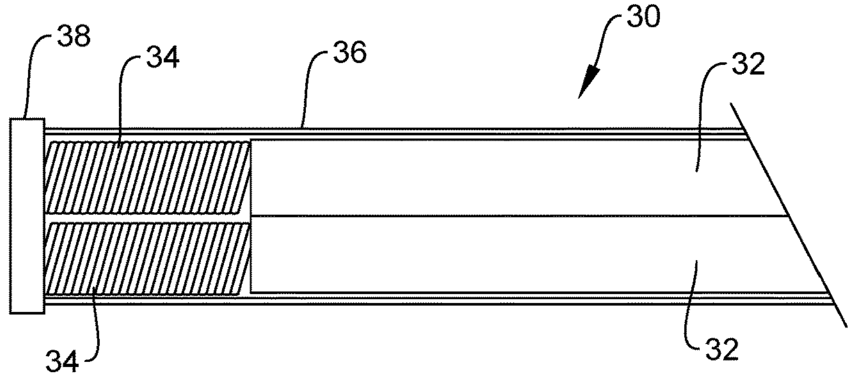
FIG. 3A is a partial side section view of an alternative embodiment of a compression bar.
Figure 3B:
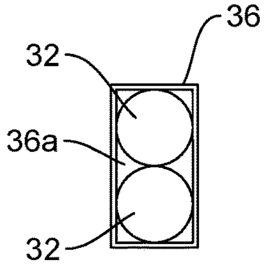
FIG. 3B is an end elevation view of the compression bar of FIG. 3A.

FIGS. 3A and 3B show an alternative embodiment of a compression bar 30, comprising a pair of compression rods. Cutting through a first rod will act as a brake on the cutting blade, and reduce the ability of the blade to cut through the second rod. FIG. 3A only shows one end of compression bar 30, the opposite end being a mirror image. Compression bar 30 comprises two identical rods 32 with springs 14 at either end of each rod, that are arranged in parallel and positioned within the interior space of a tube 36. End caps 38 are positioned at either end of tube 36 to retain rods 32 and springs 34 within the tube. The length of tube 36 is shorter than the combined length of a rod 32 and free length of springs 34, such that the springs are compressed and are positioned to exert a longitudinal compressive force on the ends of each rod.

As best shown in FIG. 3B, rods 32 have circular cross-sections, and the walls of tube 36 have an inner surface that forms an interior space 36*a* with a rectangular cross-section that is sized and shaped to receive the rods. When viewed in cross-section, circular rods 32 only have point (tangential) contact with each other and with the inner surface of the rectangular walls of tube 36, and are otherwise spaced apart from the tube and each other.

Figure 4A:
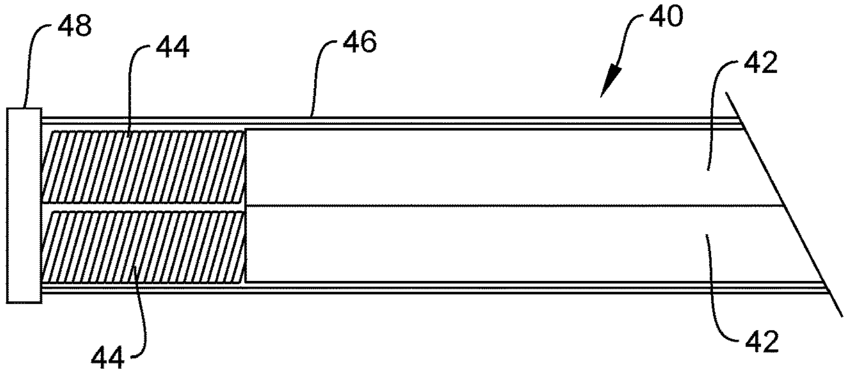
FIG. 4A is a partial side section view of an alternative embodiment of a compression bar.
Figure 4B:
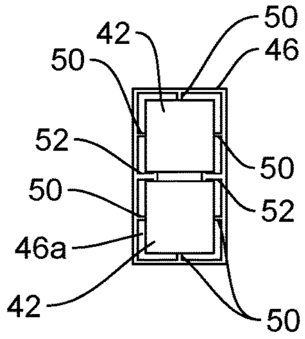
FIG. 4B is an end elevation view of the compression bar of FIG. 4A.

FIGS. 4A and 4B show an alternative embodiment of a compression bar 40, comprising two rods 42, springs 44, a tube 46, and end caps 28 that are assembled in the same configuration as compression bar 30. As best shown in FIG. 4B, rods 42 have rectangular cross-sections, and the walls of tube 46 have an inner surface that forms an interior space 46*a* with a complementary rectangular cross-section that is sized and shaped to receive the rods. The walls of tube 46 have flanges or ribs 50 and 52 that extend toward interior space 46*a* such that rods 42 are separated from each other, and only have point contact with the tube when viewed in cross-section. In a preferred embodiment, ribs 52 have a T-shaped cross-section and extend between rods 42, such that the rods are spaced apart by the arms of the "T".

Those of skill in the art will appreciate that other configurations may be used to limit the contact between the compression rod and casing, and/or between two parallel rods. For example, separately formed spacers may be inserted between the rods and/or casing. However, it is generally desirable to maximize the thickness of the rod relative to the interior space of the casing, to increase resistance to cutting. It is also desirable to reduce the complexity of the shapes to reduce manufacturing costs. In a preferred embodiment, the compression rod has a hexagonal cross-section and the casing has an inner surface that forms an interior space with a circular cross-section.

The compression rod may be made of a variety of cut-resistant materials, including various metals, porcelain, ceramics, and abrasive materials as are known in the art. In a preferred embodiment, the compression rod is made of hardened steel. The casing may be made of the same or different material as the compression rod. In a preferred embodiment, the casing and compression rod are made of different metals. Because the compression bar primarily relies on the compression rod to resist cutting, the casing may be made of metals that are easier to machine or extrude to form the interior space. For example, the compression rod may be made of hardened steel and the casing may be made of aluminum.

Figure 5:
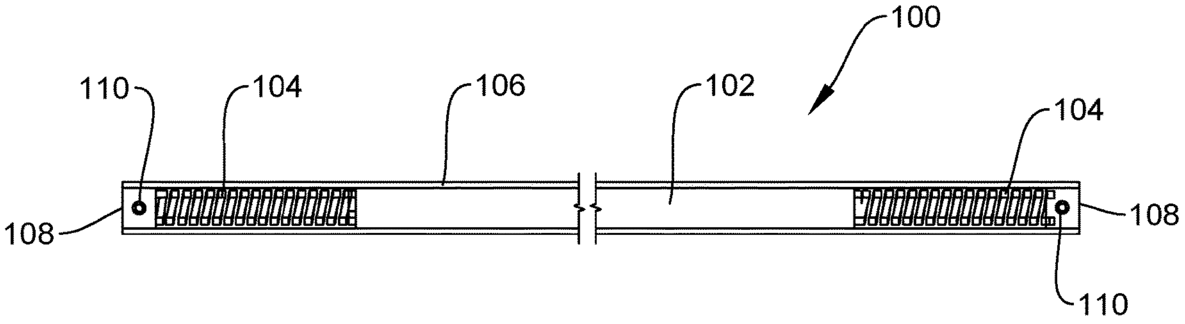
FIG. 5 is a side section view of an alternative embodiment of a compression bar.
Figure 7:
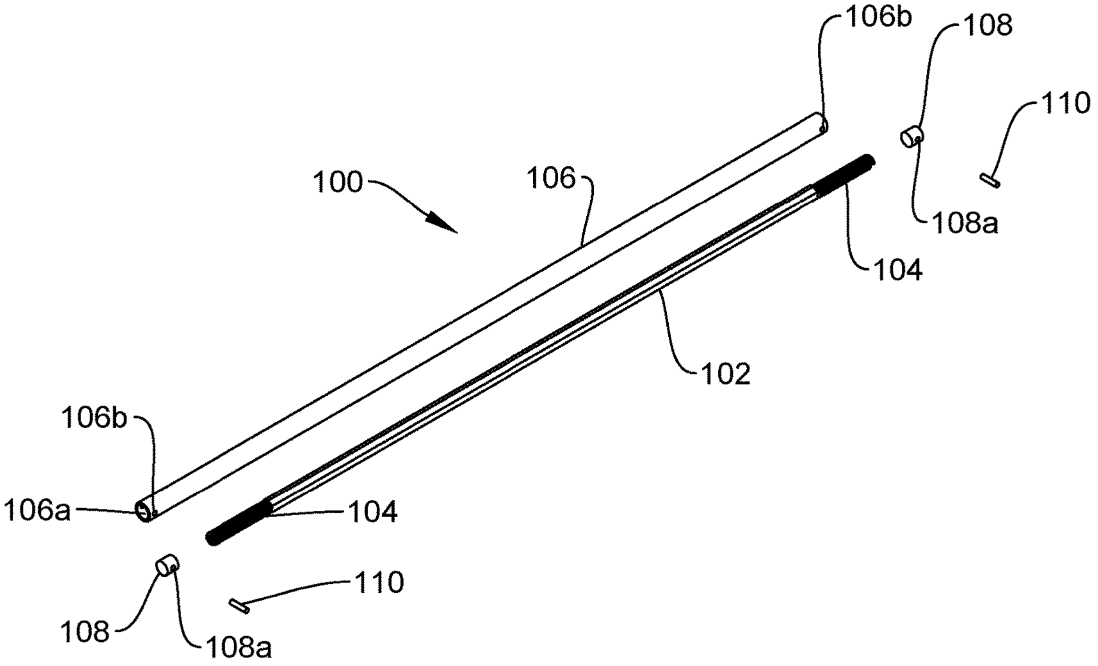
FIG. 7 is an exploded view of the compression bar of FIG. 5.

FIGS. 5 and 7 show an embodiment of a compression bar 100 for use in a door security system, that has a similar configuration to compression bar 10. Compression bar 100 comprises a rod 102 and springs 104 that are positioned at either end of the rod. Rod 102 and springs 104 are positioned within the interior space 106*a* of a hollow casing or cylindrical tube 106. As best shown in FIG. 7, rod 102 has a hexagonal cross-section and interior space 106*a* has an inner surface with a circular cross-section. End plugs 108 are sized and shaped to fit within interior space 106*a* and are positioned at the opposite ends of tube 106, adjacent to springs 104. Corresponding openings 106*b* and 108*a* are respectively formed at the ends of tube 106 and in end plugs 108, for receiving end plug pins 110 to secure the end plugs in position and retain rod 102 and springs 104 under compression within interior space 106*a*.

Compression bar 100 has a length that substantially spans the width of a standard door (i.e. about 36 inches), and may be slightly shorter than the width of the door to allow retrofit installation of existing doors. In a preferred embodiment, cylindrical tube 106 has a length of about 35 inches, with an outer diameter of about 0.75 inches and an interior diameter of about 0.583 inches defining interior space 106*a*. Rod 102 has a length of about 28.125 inches and a hexagonal cross-section with a distance of about 12 mm across flats (i.e. perpendicular distance between opposite sides of the hexagon). The difference between the distance across corners of hexagonal rod 102 (i.e. between opposite vertices) and the diameter of interior space 106*a* is preferably about 1 mm or less.

It is generally desirable that the compression bar is able to maintain compression and self-heal after at least 10 cutting attempts, which would allow the compression bar to withstand an attack for half an hour or more. Those of skill in the art will appreciate that the effectiveness of the compression bar system depends in part on the force exerted and degree of travel provided by the compression springs 104. Each cutting attempt removes material from rod 102 and reduces the compression on the rod. In general, longer springs 104 with greater travel increase the ability to maintain compression of rod 102 over multiple cuts. However, a longer spring 104 also increases the risk that a cut will be made through the spring rather than the rod, and increases the vulnerability of the compression bar.

In a preferred embodiment, compression springs 104 have a diameter of about 0.5 inches, a free length of about 4 inches, a fully compressed or solid height of about 2.94 inches, and a spring rate of about 348 lbs/in. The total length of rod 102 and springs 104 is about 36.125 inches. End plugs 110 are cylindrically-shaped with a diameter of about 0.563 inches and a length of about 0.5 inches, and are positioned within interior space 106*a* flush with the ends of tube 106. The length of interior space 106*a* between end plugs 110 is only about 34 inches, such that springs 104 are compressed to about their solid height and places rod 102 under longitudinal compression.

Figure 6:
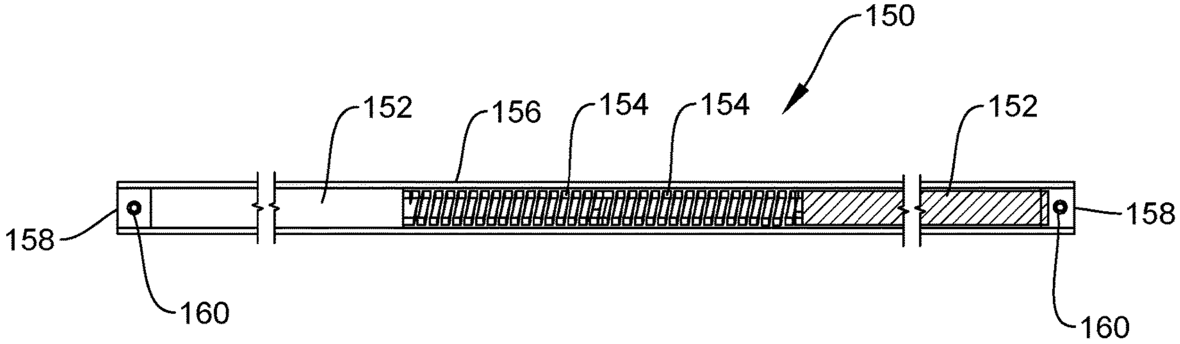
FIG. 6 is a side section view of an alternative embodiment of a compression bar.

FIG. 6 shows an alternative embodiment of a compression bar 150, that comprises rods 152, springs 154, a tube 156, end plugs 158, and end plug pins 160. Compression bar 150 has a similar configuration to compression bar 100, except that two adjacent springs 154 (or a single spring of double length) are positioned between two rods 152, and end plugs 158 are positioned within interior space 156*a* at the opposite ends of tube 106, adjacent to rods 152. The lengths of rods 152 may be the same or different. In one embodiment, the components of compression bar 150 have the same configurations and dimensions as in compression bar 100, except that each rod 152 has a length that is about half the length of rod 102. For example, rods 152 may each have a length of about 14.125 inches.

In a preferred embodiment, single-rod compression bars 100 and 150 are used in combination. As best shown in FIGS. 5 and 6, when compression bars 100 and 150 are aligned and are substantially parallel, the respective springs 104 and 154 do not overlap. An attempt to cut transversely across compression bars 100 and 150 at any point along their length, will require the cutting tool to cut through at least one rod 102 or 152. For example, multiple compression bars 100, 150 may be installed to reinforce a structure (e.g., a door), and are preferably in an alternating arrangement that avoids consecutive compression bars with the same configuration. Compression bars 100, 150 are aligned with their longitudinal axes substantially parallel (e.g., substantially horizontal to a door). Compression rods 102, 152 extend substantially parallel to the longitudinal axis of their respective compression bars 100, 150. Springs 104, 154 are also positioned to exert compressive force on their respective compression rods 102, 152 in a direction parallel to the longitudinal axis of their respective compression bars 100, 150. In this arrangement, springs 104, 154 of consecutive compression bars 100, 150 do not overlap with respect to a plane perpendicular to the longitudinal axes of the compression bars (e.g., a plane vertical to a door). As a result, an attempt to cut through the multiple compression bars 100, 150 must cut through at least one rod 102, 152.

It is also preferred to secure a single-rod compression bar to a door or other structure at both ends. When a compression rod is cut, the casing ensures that the cut ends are aligned to allow self-healing of the cut ends and maintain compression on the rod. If the casing is also cut through, the cut ends of the casing may shift and prevent the proper alignment of the compression rod to self-heal and maintain compression. Therefore, it is desirable to secure both ends of the casing to prevent shifting in the event the casing is cut through.

The need to secure both ends of the case is reduced in compression bars that contain two or more compression rods that are positioned closely together. As a cutting tool begins to cut through the compression bar, the first compression rod will stop or slow the tool to prevent it from cutting through the adjacent compression rod(s). As a result, the tool cannot cut through the casing, which ensures the proper alignment of the compression rods to self-heal and maintain compression.

Figure 8:
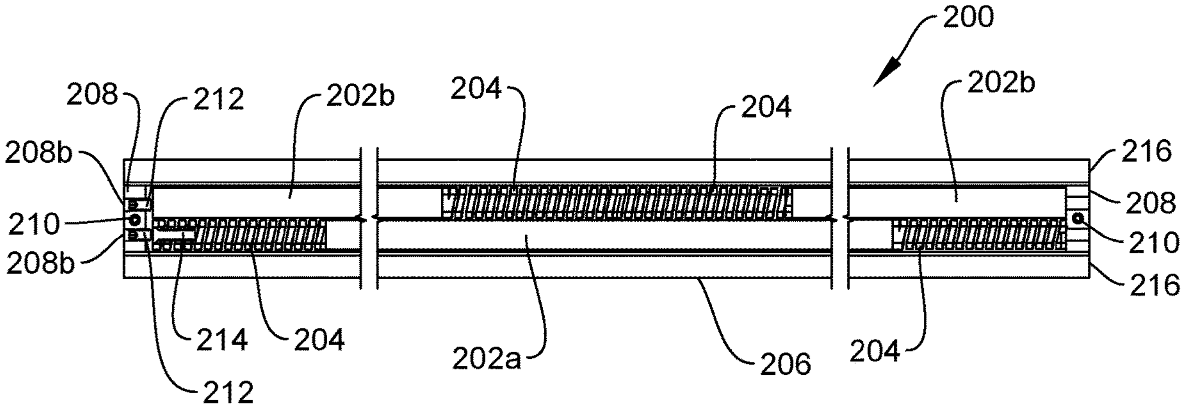
FIG. 8 is a top section view of an alternative embodiment of a compression bar.
Figure 9:
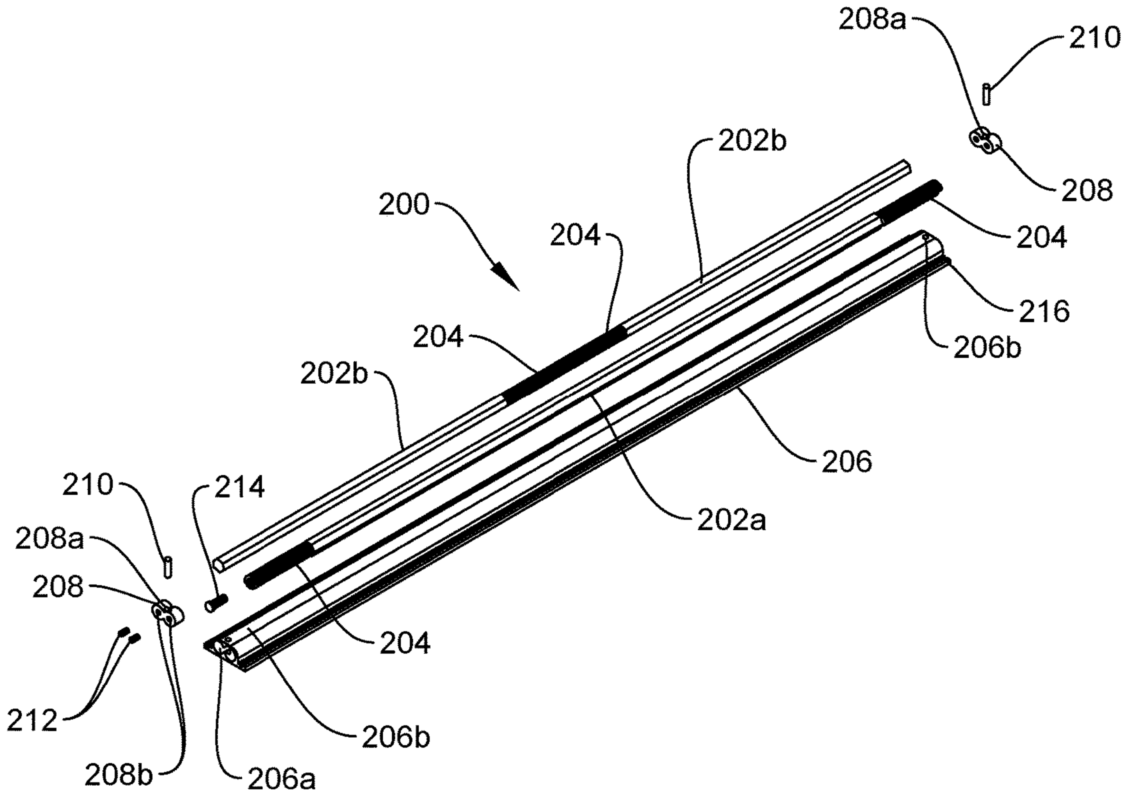
FIG. 9 is an exploded view of the compression bar of FIG. 8.

FIGS. 8 and 9 show an embodiment of a compression bar 200, that combines compression bars 100 and 150 in a single security device. Compression bar 200 comprises first and second compression rod assemblies that are arranged in parallel. The first assembly comprises a rod 202*a* extending parallel to the longitudinal axis of compression bar 200, and two springs 204 that are positioned at either end of the rod to exert compressive force in a direction parallel to the longitudinal axis, in the same configuration as rod 102 and springs 102. The second assembly comprises two adjacent springs 204 that are positioned between two rods 202*b*, in the same configuration as rods 152 and springs 154. Rods 202*b* are positioned parallel to rod 202*a*, and springs 204 exert compressive force in a direction parallel to the longitudinal axis.

The first and second compression rod assemblies are positioned closely together within the interior space 206*a* of hollow casing 206. Interior space 206*a* has a bilobed cross-section formed by two marginally overlapping circles. As best shown in FIG. 8, the first compression rod assembly is positioned in one lobe of interior space 206*a*, and the second compression rod assembly is positioned in the other lobe, side-by side with the first compression rod assembly. The first and second assemblies are aligned and are substantially parallel, such that the springs 204 do not overlap and a cutting tool attempting to cut through compression bar 200 must cut through at least one rod 202*a* or 202*b*. Bilobed end plugs 208 are sized and shaped to fit within interior space 206*a* and are positioned at the opposite ends of tube 206, adjacent to springs 204 of the first compression rod assembly and rods 202*b* of the second compression rod assembly. Corresponding openings 206*b* and 208*a* are respectively formed at the ends of tube 206 and in end plugs 208, for receiving end plug pins 210 to secure the end plugs in position and retain the first and second compression rod assemblies under compression.

In a preferred embodiment, rods 202*a* and 202*b*, and springs 204 have the same configurations and dimensions as rods 102 and 152, and springs 104. Casing 206 has a length of about 35 inches, with an interior space 206*a* that has a cross-section formed by two marginally overlapping circles with diameters of about 0.583 inches and a spacing of about 0.551 inches on center. The first and second compression rod assemblies are held apart, and have minimal or only point contact with each other within interior space 206*a*. End plugs 208 also have a bilobed-shape formed by two circles having outside diameters of 0.556 inches with a spacing of 0.551 inches on center, and a length of about 0.375 inches. End plugs 208 are positioned within interior space 206*a* flush with the ends of tube 206, such that the length of interior space 206*a* between the end plugs is only about 34.25 inches. Those of skill in the art will appreciate that interior space 206*a* may also be formed as separate circles, such that there is no contact between the first and second compression rod assemblies. However, this configuration may increase the size of the casing.

It is preferable that the compression springs are at their solid height and are fully compressed to maximize their compressive force and amount of throw available for self-healing. In one embodiment, the compression of the springs is adjustable to compensate for variations in manufacturing and assembly. Each lobe of end plugs 208 has a threaded hole 208*b* for receiving set screws 212 to adjust the compression. As set screws 212 are tightened and screwed through holes 208*b*, they come into contact with a spring 204 of the first compression rod assembly or a rod 202*b* of the second compression rod assembly, and effectively reduce the length of the interior space and compress springs 204. A flat headed pin 214 may be inserted in the opening of spring 204 to provide a bearing surface for the set screw 212. For example, a compression bar may be assembled with the springs at about 90% compression, and the set screws tightened to fully compress the springs.

In one embodiment, compression bar 200 may be attached to an existing structure (e.g., a door, cabinet or safe) to provide reinforcement and anti-cut protection. Various means of attachment may be used as are known in the art, including adhesives, welding, and fasteners such as rivets, bolts and screws. In a preferred embodiment, casing 206 has flanges 216 for attachment of a fastener or to provide additional surface area for an adhesive.

Figure 10:
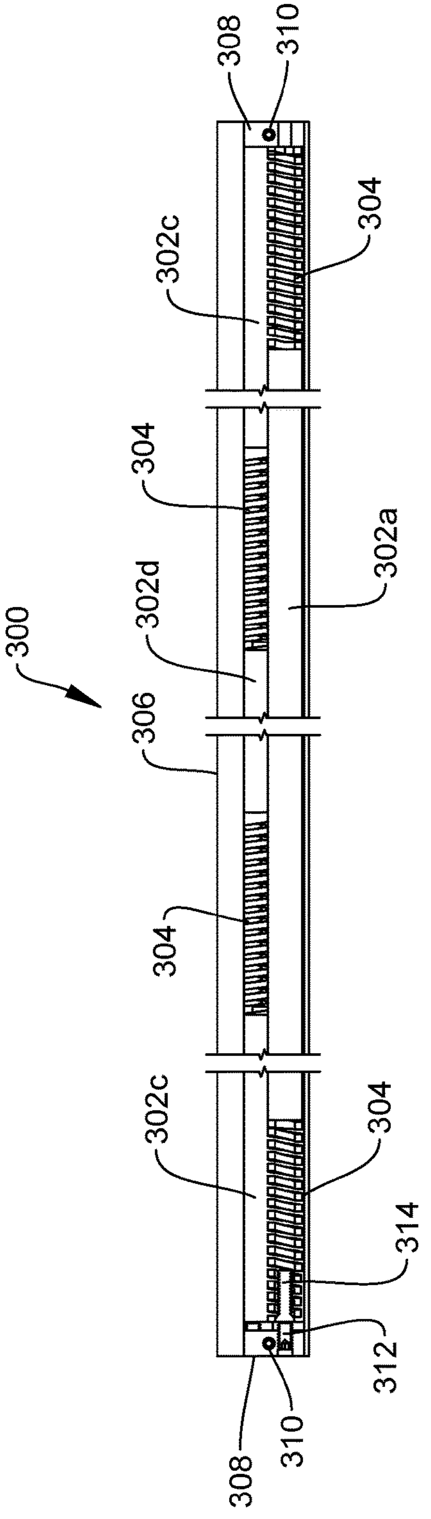
FIG. 10 is a side section view of an alternative embodiment of a compression bar.
Figure 11:
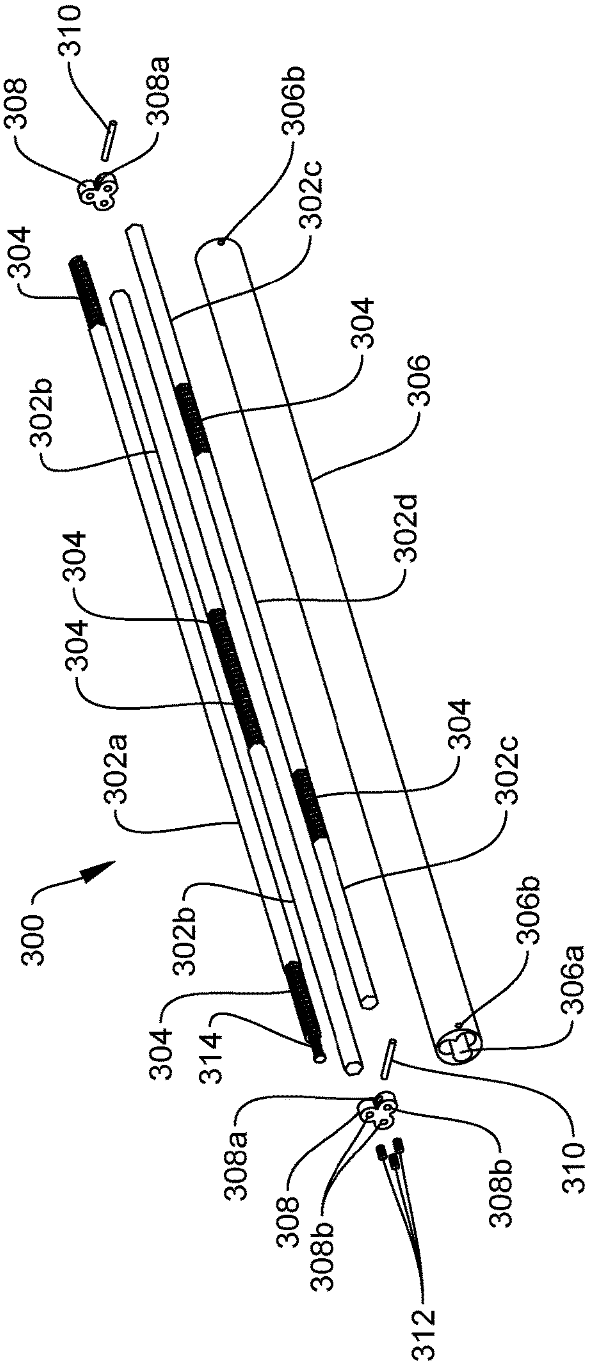
FIG. 11 is an exploded view of the compression bar of FIG. 10.

FIGS. 10 and 11 show an embodiment of a compression bar 300 that has three parallel compression rod assemblies, that requires a cutting tool to cut through at least two compression rods. Compression bar 300 comprises first, second and third compression rod assemblies that are arranged in parallel. The first assembly comprises a rod 302*a* extending parallel to the longitudinal axis of compression bar 300, and two springs 304 that are positioned at either end of the rod to exert compressive force in a direction parallel to the longitudinal axis, in the same configuration as rod 102 and springs 102. The second assembly comprises two adjacent springs 304 that are positioned between two rods 302*b*, in the same configuration as rods 152 and springs 154. Rods 302*b* are positioned parallel to rod 302*a*, and springs 304 are positioned to exert compressive force in a direction parallel to the longitudinal axis. The third assembly comprises the alternating arrangement of a rod 302*c*, a spring 304, a rod 302*d*, a spring 304, and a rod 302*c*. Rods 302*c* and 302*d* are positioned parallel to rods 302*a* and 302*b*, and springs 304 are positioned to exert compressive force in a direction parallel to the longitudinal axis.

The compression rod assemblies are positioned within the interior space 306*a* of hollow casing 306. Interior space 306*a* has a trilobed cross-section formed by three marginally overlapping circles. As best shown in FIG. 10, each compression rod assembly is positioned in a separate lobe of interior space 306*a*, parallel to the longitudinal axis of the interior space and compression bar 300. The assemblies are aligned and are substantially parallel, such that the springs 304 do not overlap with respect to a plane perpendicular to the longitudinal axis, and a cutting tool must cut through at least two of rods 302*a*, 302*b*, and 302*c* or 302*d*. Trilobed end plugs 308 are sized and shaped to fit within interior space 306*a* and are positioned at the opposite ends of tube 306, adjacent to springs 304 of the first compression rod assembly and rods 302*b* and 302*c* of the second and third compression rod assemblies. Corresponding openings 306*b* and 308*a* are respectively formed at the ends of tube 306 and in end plugs 308, for receiving end plug pins 310 to secure the end plugs in position and retain the compression rod assemblies under compression.

Similarly to end plugs 208, each lobe of end plugs 308 may have a threaded hole 308*b* for receiving set screws 312 to adjust the compression. As set screws 312 are screwed through holes 308*b*, they come into contact with a spring 304 of the first compression rod assembly or a rod 302*b* or 302*c* of the second and third compression rod assemblies, to increase the compression. A flat headed pin 314 may be inserted in the opening of spring 304 to provide a bearing surface for the set screw 312.

In a preferred embodiment, rods 302*a* and 302*b*, and springs 304 have the same configurations and dimensions as rods 102 and 152, and springs 104. Rods 302*c* and 302*d* have the same configuration and dimensions as rod 152, except that rod 302*c* has a length that is about half the length of rod 302*b*. For example, rods 302*c* may each have a length of about 7.125 inches. Casing 306 is cylindrical with an outer diameter of about 1.338 inches and a length of about 35 inches. Interior space 306*a* is similar to interior space 206*a*, and has a cross-section formed by three circles with diameters of about 0.583 inches and an equilateral spacing of about 0.549 inches on center. Because the circles are only marginally overlapping, the first, second and third compression rod assemblies are held apart, and have minimal or only point contact with each other within interior space 306*a*. End plugs 308 also have a trilobed-shape formed by three circles having outside diameters of 0.556 inches with a spacing of 0.549 inches on center, and a length of about 0.375 inches. End plugs 308 are positioned within interior space 306*a* flush with the ends of tube 306, such that the length of interior space 306*a* between the end plugs is only about 34.25 inches.

In a preferred embodiment, the compression rods are made of hardened steel, the casings or tubes are made of aluminum, and the end plugs are made of steel.

Figure 12:
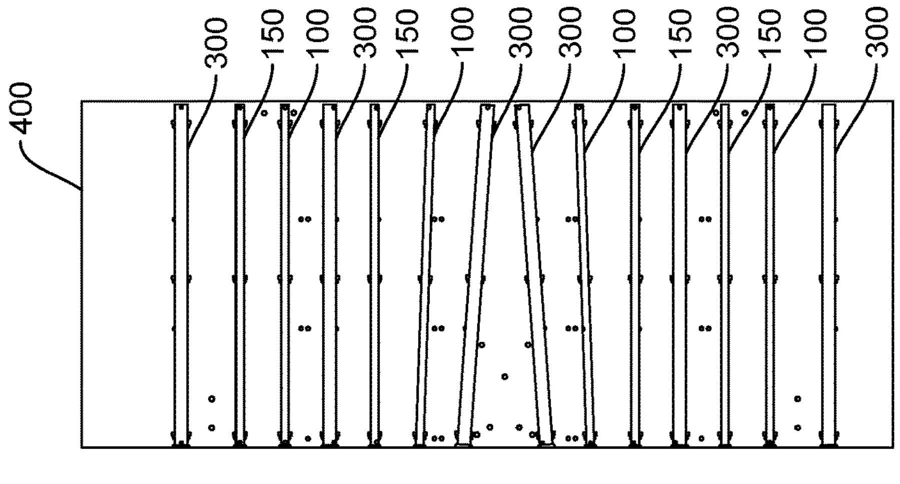
FIG. 12 is a rear elevation section view of a door, showing an embodiment of the installation of the compression bars of FIGS. 5, 6 and 10.

Compression bars 100, 150 and 300 are particularly suited for retrofit installation in the interior space of a standard hollow door. One or more compression bars may be inserted laterally within the door to span across the width of the door. The compression bars may be the same type, or may be a combination of different types. FIG. 12 shows an embodiment of security door system comprising a retrofit installation of compression bars 300, 100, and 150 within a standard hollow door 400. Compression bars 300 are preferably positioned at the top and bottom of door 400 and/or proximal to vulnerable door hardware such as the lock and or hinges. Pairs of compression bars 100 and 150 are arranged between compression bars 300. In a preferred embodiment, compression bars 100 and 150 are in an alternating arrangement that avoids consecutive compression bars with the same configuration. The compression bars are preferably arranged substantially parallel to each other. However, one or more compression bars may be angled to avoid interfering with any door hardware.

Figure 14:
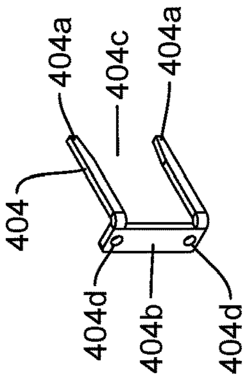
FIG. 14 is an isometric view of a compression bar bracket of FIG. 13, for installing the compression bar of FIG. 10.

The compression bars may be oriented and secured in position within the interior space of door 400 by brackets. FIG. 14 shows an embodiment of a compression bar bracket 404, that comprises and L-shaped flange with two arms 404*a* extending perpendicularly from a base 404*b*. Bracket 404 is installed in door 400 by drilling holes in the rear side of the door for inserting arms 404*a* into the interior space of the hollow door. Openings 404*d* may be provided in base 404*b* for receiving fasteners (e.g., screws) to secure bracket 404 to door 400. Arms 404*a* extend into the interior space of door 400, and are spaced apart to define a space 404*c* that is sized and shaped to receive a compression bar. In one embodiment, arms 404*a* extend from base 404*b* by about 1.72 inches, and have a spacing of about 1.35 inches to receive larger compression bars, such as compression bar 300.

Figure 15:
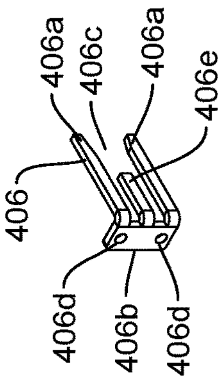
FIG. 15 is an isometric view of a compression bar bracket of FIG. 13, for installing the compression bars of FIGS. 5 and 6.

FIG. 15 shows an alternative embodiment of a compression bar bracket 406, for holding smaller compression bars. Bracket 406 has a similar configuration to bracket 404, with two arms 406*a* extending perpendicularly from a base 406*b*. A third arm 406*e* extends between arms 406*a*. Bracket 406 is installed in door 400 in the same manner as bracket 404, by drilling holes in the rear side of the door for inserting arms 406*a* and 406*e* into the interior space of the door. Openings 406*d* may be provided in base 406*b* for receiving fasteners to secure bracket 406 to the rear side of door 400. Arms 406*a* extend into the interior of the door and are spaced apart to define a space 406*c* that is sized and shaped to receive a compression bar. In one embodiment, arms 406*a* extend from base 406*b* by about 1.72 inches, and have a spacing of about 0.75 inches to receive smaller compression bars, such as compression bars 100 and 150. Arm 406*e* extends into space 406*c* to restrain the compression bar from moving laterally within the space and to position the compression bar adjacent to the front side of door 400. In one embodiment, arm 406*e* extends from base 406*b* by about 0.88 inches, such that space 406*c* has height between arms 406*a* of about 0.75 inches and a depth of about 0.84 inches.

Compression bar brackets 404 and 406 may be made of metal or other materials as are known in the art. In a preferred embodiment, compression bar brackets 404 and 406 are made of steel. Once compression bars 300, 100 and 150 are installed within door 400, the interior of the door may be filled with a fire retardant material, such as a fire retardant foam. Conventional metal doors commonly have cores that contain honeycombed-shaped cardboard, which can catch fire from the frictional heat produced by cutting tools. The use of fire retardant materials reduces the risk of fire. In addition, fire retardant foams can bond the security assembly to the outer skin or shell of the door.

Figure 13:
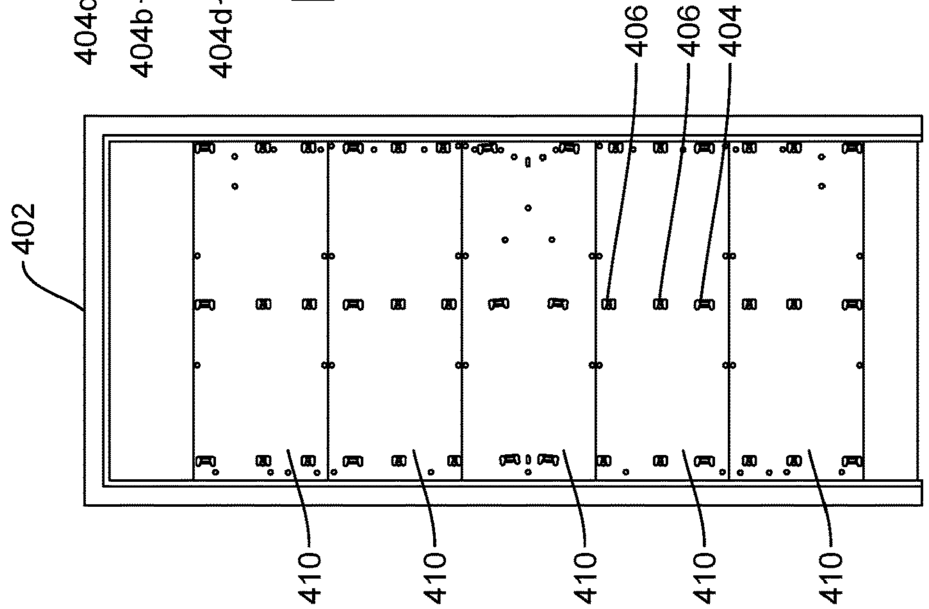
FIG. 13 is a rear elevation view of the door of FIG. 12, showing the installation of embodiments of security plates and compression bar brackets.

In one embodiment, one or more anti-drill plates 410 may be attached to door 400 to improve resistance to drilling. FIG. 13 shows a door 400 in a frame 402, with plates 410 positioned on the rear side of door 400. Plates 410 may include a series of openings sized and shaped to receive the bracket arms, that are arranged in a predetermined pattern to position the bracket arms in the interior space of the door, and that provides a template for drilling holes in the rear side of door 400 for inserting arms 404*a*, 406*a* and 406*e* of brackets 404 and 406. In a preferred embodiment, plates 410 have a height of about 13.75 inches, and a width of about 34.5 inches that substantially spans the width of a standard door. Five plates 410 are coupled to the rear side of door 400 for a total height of 68.75 inches. Plates 410 may be made of the same or different materials. For example, plates 410 positioned near the lock or other vulnerable door hardware may be made of hardened steel or other drill-resistant material. Plates 410 that are positioned at the top and bottom of the door are at lower risk of attack by drilling. These plates 410 function primarily as templates for installation of brackets 404 and 406, and may be made of other materials, such as aluminum.

Figure 16:
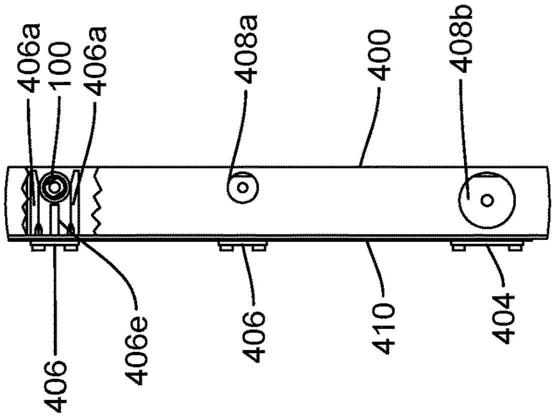
FIG. 16 is a detail side elevation, partial section view of the door of FIG. 13.

FIG. 16 shows the installation of a compression bar 100 in door 400. Plate 410 is attached to the rear side of door 400 and serves as a template for the installation of brackets 404 and 406. Arms 404*a* and 404*e* are shown extending into the interior of door 400 to receive and secure a compression bar 100 adjacent to the front side of the door. The compression bars may be inserted into the interior of door 400 through holes drilled in the side of the door, and mounted on the bracket arms. Cover plates 408*a* and 408*b* may be used to cover the holes in the side of door 400 after installation of the compression bars.

Figure 17:
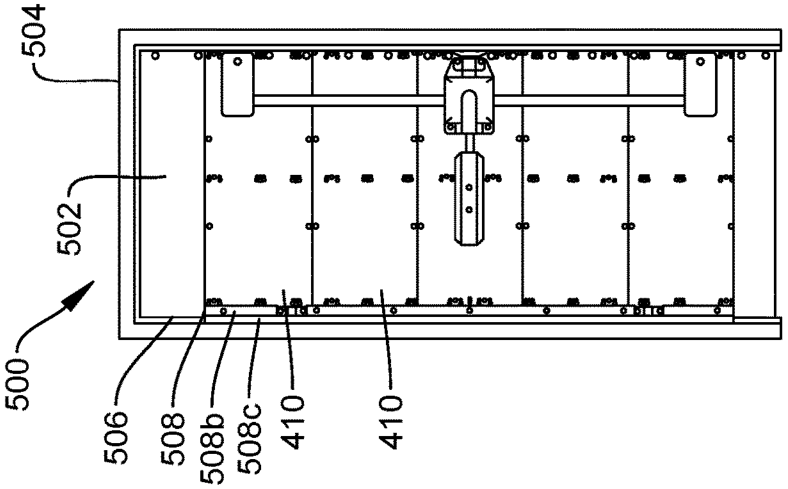
FIG. 17 is a rear elevation view of a door, showing the installation of an embodiment of a hinge security bracket.
Figure 18:
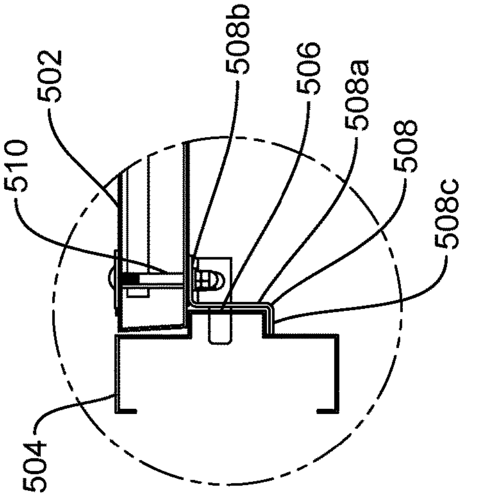
FIG. 18 is a detail top section view of the door of FIG. 17.

FIGS. 17-20 show embodiments of a security door system that provides protection against forced entry by prying. In some cases, forced entry may be attempted by cutting the hinges of a door to enable the door to be pried open. FIGS. 17 and 18 show an embodiment of a security door system 500 comprising a conventional door 502, and a door frame 504 that has a hinge side jamb that forms a door stop 506. A hinge bracket 508 is positioned at the rear, hinge side of door 502. As best shown in FIG. 18, hinge bracket 508 has a Z-shaped cross-section that is sized and shaped to conform to the configuration of door stop 506 and door 502 in the closed position. Hinge bracket 508 comprises a spacer 508*a* is positioned adjacent to and extends across the width of door stop 506. Arms 508*b* and 508*c* extend perpendicularly from the opposite ends of spacer 508*a*. Arm 508*b* extends toward the lock side of door 502, parallel and adjacent to the rear side of the door, and is coupled to the door. In one embodiment, arm 508*b* is secured to the rear side of door 502 by a fastener, such as one or more carriage bolts 510 that extend through the door. Arm 508*c* is positioned beyond door stop 506 and extends toward door frame 504 to capture the door stop. In one embodiment, arm 508*c* has a length of about 0.625 inches, which is the depth of a standard door stop. In the event that the hinges have been cut from door 502 and an attempt is made to pry the hinge side of door 502 outward away from frame 504, arm 508*c* of bracket 508 will engage door stop 506 and prevent the hinge side of the door from moving away from the frame.

In one embodiment, hinge bracket 508 is formed as a metal slat that has a Z-shape cross-section and a length that is sufficient to extend beyond the top and bottom hinges of door 500. In a preferred embodiment, hinge bracket 508 is made of steel and has a length of about 68.75 inches. Hinge bracket 508 may be secured to the rear side of door 502 through one or more anti-drill plates 410.

Figure 20:
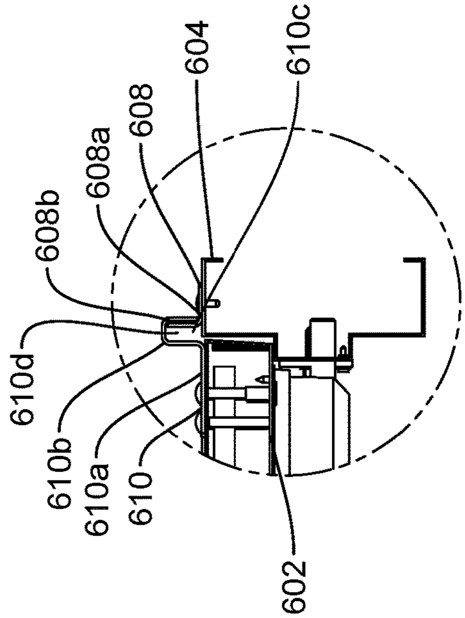
FIG. 20 is a detail top section view of the door of FIG. 19.
Figure 19:
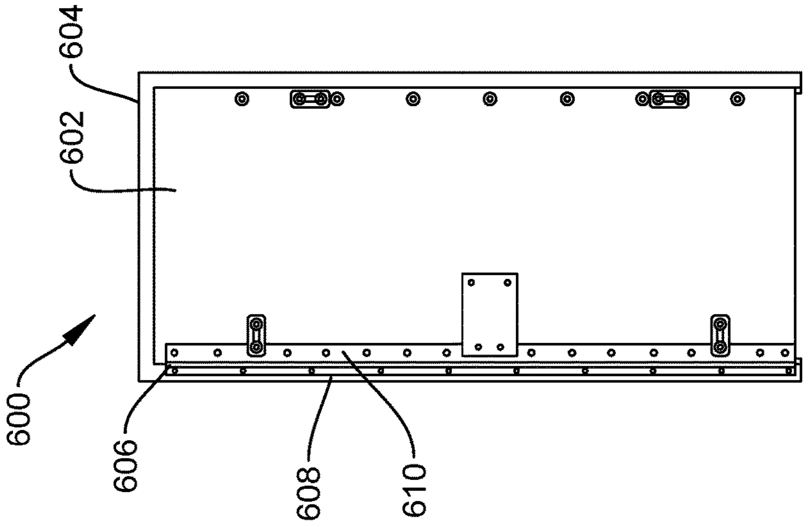
FIG. 19 is a front elevation view of a door, showing the installation of an embodiment of an interlocking astragal.

FIGS. 19 and 20 show an embodiment of a security door system 600 that comprises a conventional door 602, and a door frame 604. An astragal 606 is positioned across the seam between the front, lock side of door 602 and the door frame 604, to protect the lock side of the door from being pried open. In one embodiment, astragal 606 extends substantially the height of door 602, and is preferably made of steel with a length of about 82 inches.

As best shown in FIG. 20, astragal 606 comprises a frame flange 608 and a door flange 610. Frame flange 608 has a generally L-shaped cross-section comprising a base 608*a* that is coupled to door frame 604, and an arm 608*b* that extends perpendicularly from one end of the base and projects away from the door frame. Arm 608*b* is preferably positioned along the edge of door frame 604 adjacent to the seam between the frame and door 602. In one embodiment, base 608*a* is coupled to door frame 604 by a fastener, such as a rivet. Door flange 610 also has a base 610*a* that is coupled to the front side of door 602, and an arm 610*b* that extends from one end of the base and projects across the seam between the door and door frame 604. Base 610*a* may be coupled to door 602 by a fastener, such as a carriage bolt. In one embodiment, arm 610*b* is bent back upon itself to form a U-shape that opens toward door frame 604. U-shaped arm 610*b* defines an opening 610*c* and interior space 610*d* that are sized and shaped to receive arm 608*b* of frame flange 608. When door 602 is in the closed position, opening 610*c* is positioned to receive arm 608*b* in interior space 610*d* to prevent access to the seam between the door and door frame 604.

Figure 21:
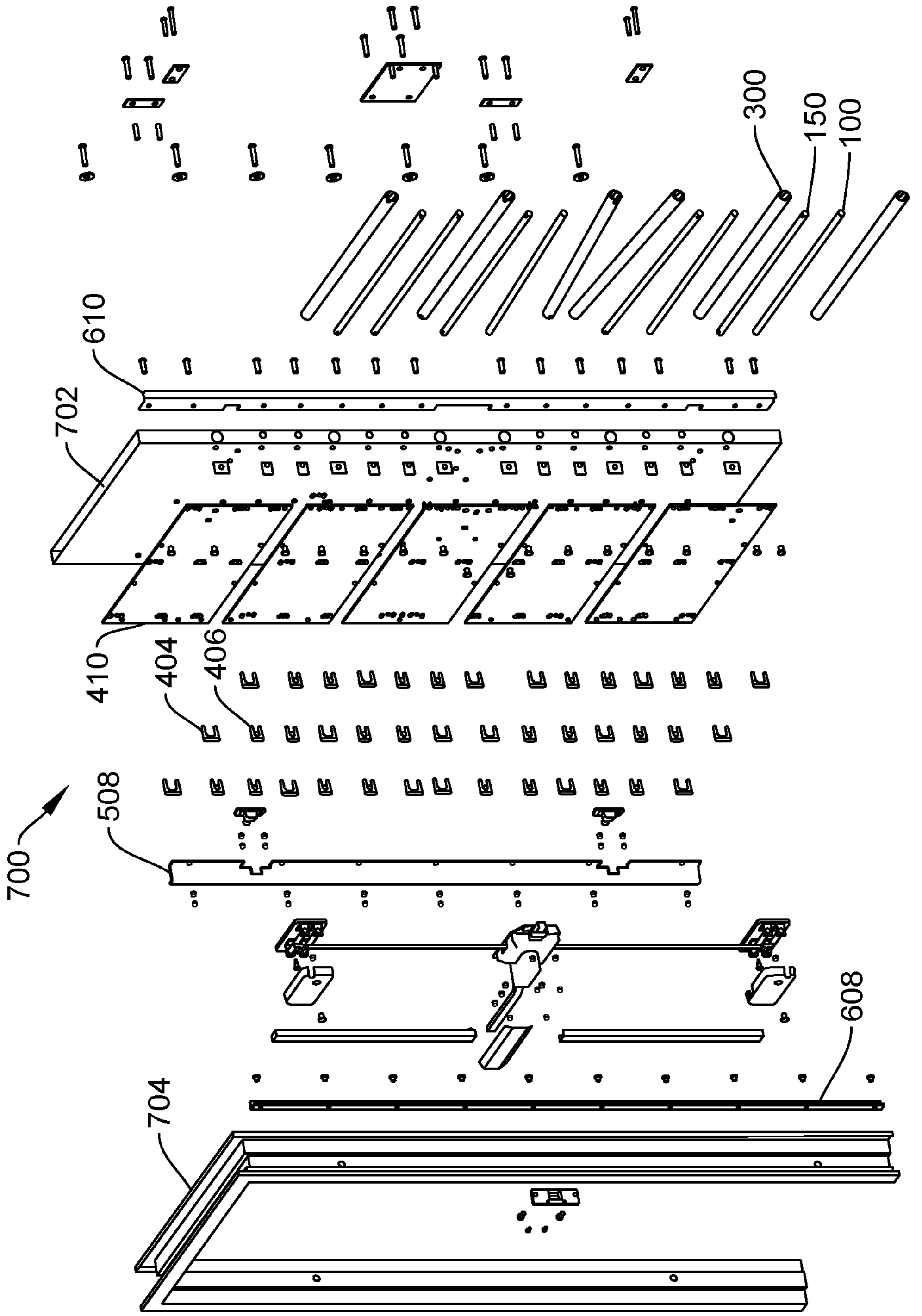
FIG. 21 is an exploded view of an embodiment of a door security system.

FIG. 21 shows an embodiment of a security door system 700 that comprises the anti-cut, anti-drill, and anti-pry embodiments described above. Security door system 700 comprises a door 702 and door frame 704. Anti-cut compression bars 300, 100, and 150 are positioned in the interior of door 702 by compression bar brackets 404 and 406. Anti-drill plates 410 are positioned on the rear side of the door and serve as templates for installing compression bar brackets 404 and 406. Hinge bracket 508 is positioned at the rear, hinge side of door 702. Astragal 606 is positioned across the seam between the front, lock side of door 702 and door frame 704, and comprises frame flange 608 and door flange 610. Frame flange 608 is positioned along the edge of door frame 704 adjacent to the seam between the frame and door 702. Door flange 610 is coupled to the front side of door 702, and extends across the seam between the door and door frame 704.

Figure 22:
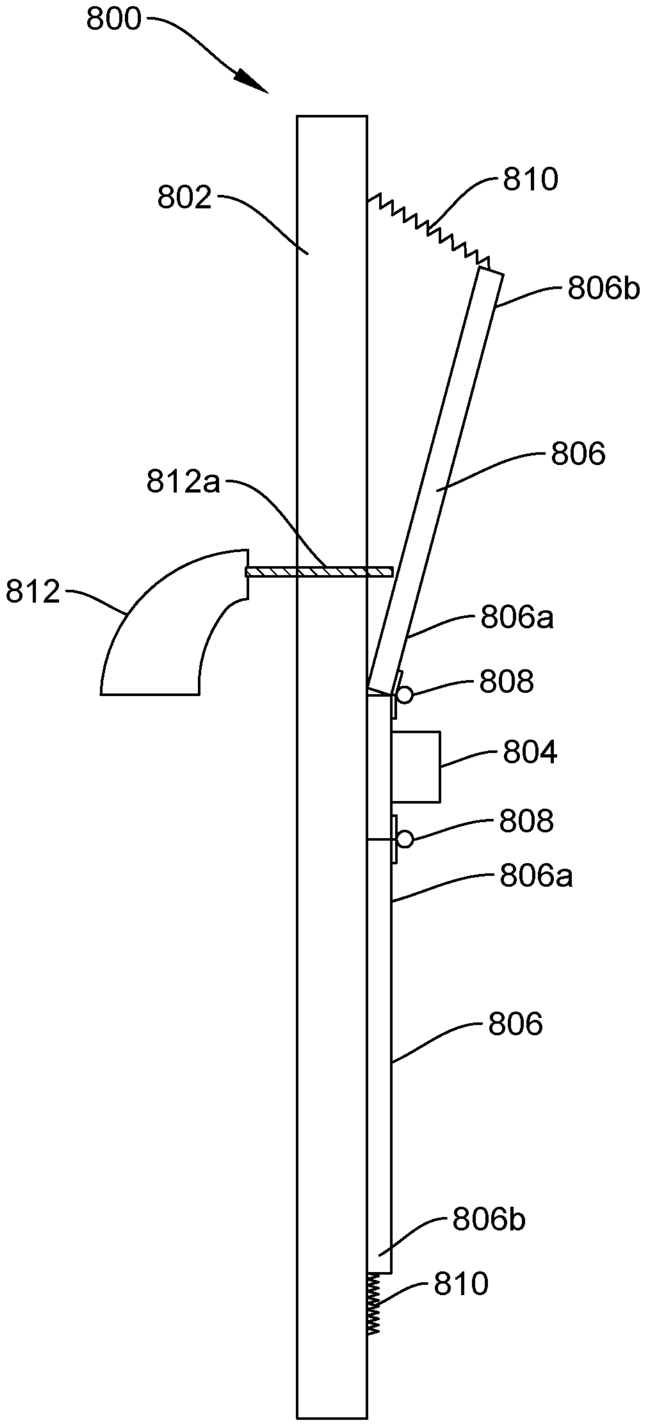
FIG. 22 is a side section view of an alternative embodiment of a door security plate.

FIG. 22 shows an embodiment of a security door system 800 incorporating an alternative embodiment of an anti-drill plate. Commercial rear doors are commonly operated by a conventional push bar panic exit device. In some cases, forced entry involves drilling a hole through a door and then inserting a hooked rod or other tool through the hole to engage the push bar from the rear to open the door. Security door system 800 comprises a door 802 operated by a push bar 804. Anti-drill plates 806 are positioned on the rear side of door 802 proximal to push bar 804, and preferably are positioned above and below the push bar. Plates 806 have an end 806*a* proximal to push bar 804 that is pivotally coupled to door 802, such that opposite end 806*b* distal to the push bar may rotate away from the door. In one embodiment, ends 806*a* of plates 806 are coupled to door 802 by a hinge 808. Plates 806 are configured to bias the rotation of ends 806*b* in the direction back toward door 802. In one embodiment, ends 806*b* are coupled to door 802 by springs 808. The rotation of ends 806*b* away from door 802 stretches springs 808, which urge ends 806*b* back toward door 802.

A drill 812 is shown with a drill bit 812*a*. As drill bit 812*a* drills through door 802 and comes into contact with a plate 806, hinge 808 allows the plate to rotate away such that the drill bit cannot drill a hole through the plate. Once drill bit 812*a* is withdrawn, plate 806 is urged back toward door 802 by spring 810 to cover the hole in the door and prevent the insertion of a tool through the hole to access push bar 804.

Figure 23:
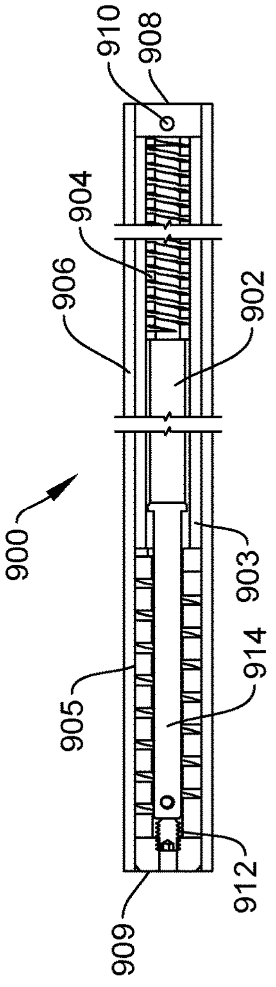
FIG. 23 is a side section view of an alternative embodiment of a compression bar.
Figure 24:
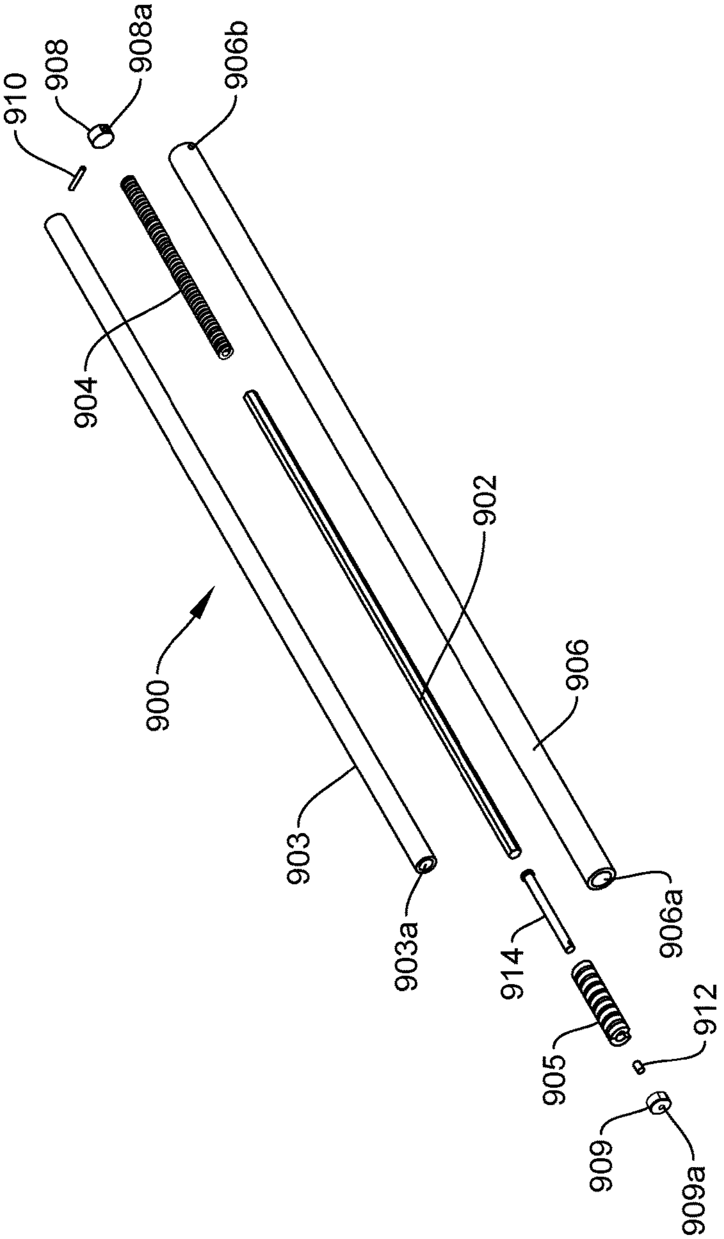
FIG. 24 is an exploded view of the compression bar of FIG. 23.

FIGS. 22 and 23 show an alternative embodiment of a compression bar 900 that has telescoping compression rods. Compression bar 900 comprises an inner compression rod assembly comprising an inner rod 902 and an inner spring 904 positioned at one end of the inner rod, an outer compression rod assembly comprising a tubular outer rod 903 and an outer spring 905 positioned at one end of the outer rod, and a hollow casing or tube 906. The outer compression rod assembly is positioned within the interior space 906*a* of casing 906, and the inner compression rod assembly is positioned within the interior space 903*a* of outer rod 903. Springs 904 and 905 are positioned at opposite ends of compression bar 900, such that the compressive forces on rods 902 and 903 are exerted in opposite directions.

End plugs 908 and 909 are sized and shaped to fit within interior space 906*a* and are positioned at the opposite ends of tube 906, adjacent to springs 904 and 905. Corresponding openings may be formed at the ends of the casing and in the end plugs, for receiving end plug pins to secure the end plugs in position and retain the inner and outer compression rod assemblies under compression—for example, corresponding openings 906*b* and 908*a*, and end plug pin 910 for securing end plug 908. In one embodiment, end plug 909 has a threaded hole 909*a* for receiving a set screw 912 to adjust the compression of the inner compression rod assembly. An extension pin 914 may be inserted through the center of spring 905 to couple set screw 912 to inner rod 902.

In one embodiment, inner rod 902 has a similar configuration as rod 102, with a hexagonal cross-section. Outer rod 903 may be a hollow cylinder, with an interior space 903*a* having a circular cross-section that is sized to receive rod 902, such that there is only point contact between the two rods. Casing 906 may also be a hollow cylinder with an interior space 903*a* having a circular cross-section that is sized to receive rod 903. In an alternative embodiment, outer rod 903 may have an outer circumference that is hexagonal or other shape such that there is only point contact between the outer rod and casing 906.

The telescoping design of compression bar 900 has a number of advantages. It provides a design with two compression rods that is generally more compact and less complex to manufacture than lobed compression bar 200. It allows for a larger, thicker spring 905 for outer rod 903, which increases the compressive force. In addition, springs 904 and 905 exert compressive forces in opposite directions, which is believed to improve the ability of the compression bar to arrest a cutting blade.

Figure 26:
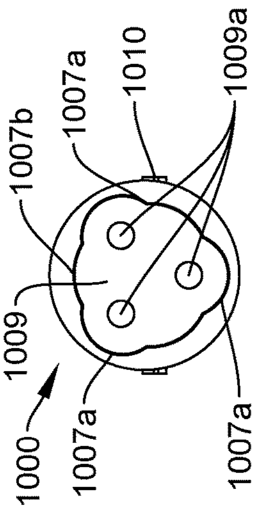
FIG. 26 is a front elevation section view of the compression bar of FIG. 25.
Figure 25:
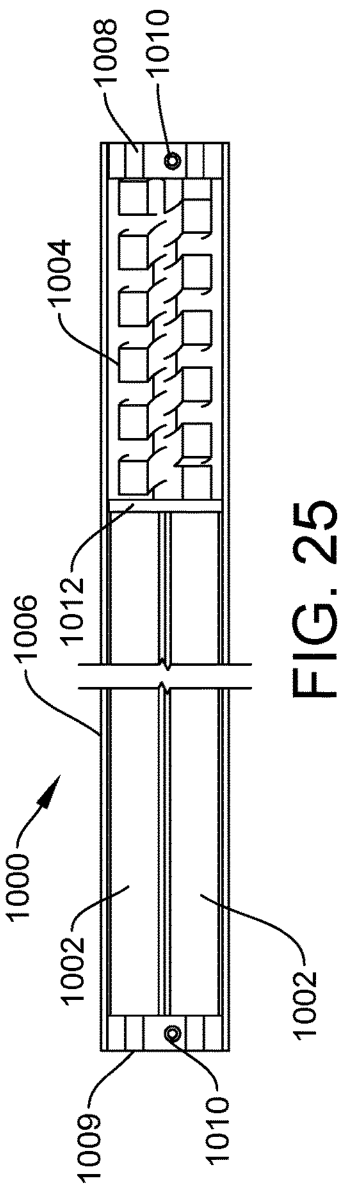
FIG. 25 is a side section view of an alternative embodiment of a compression bar.
Figure 27:
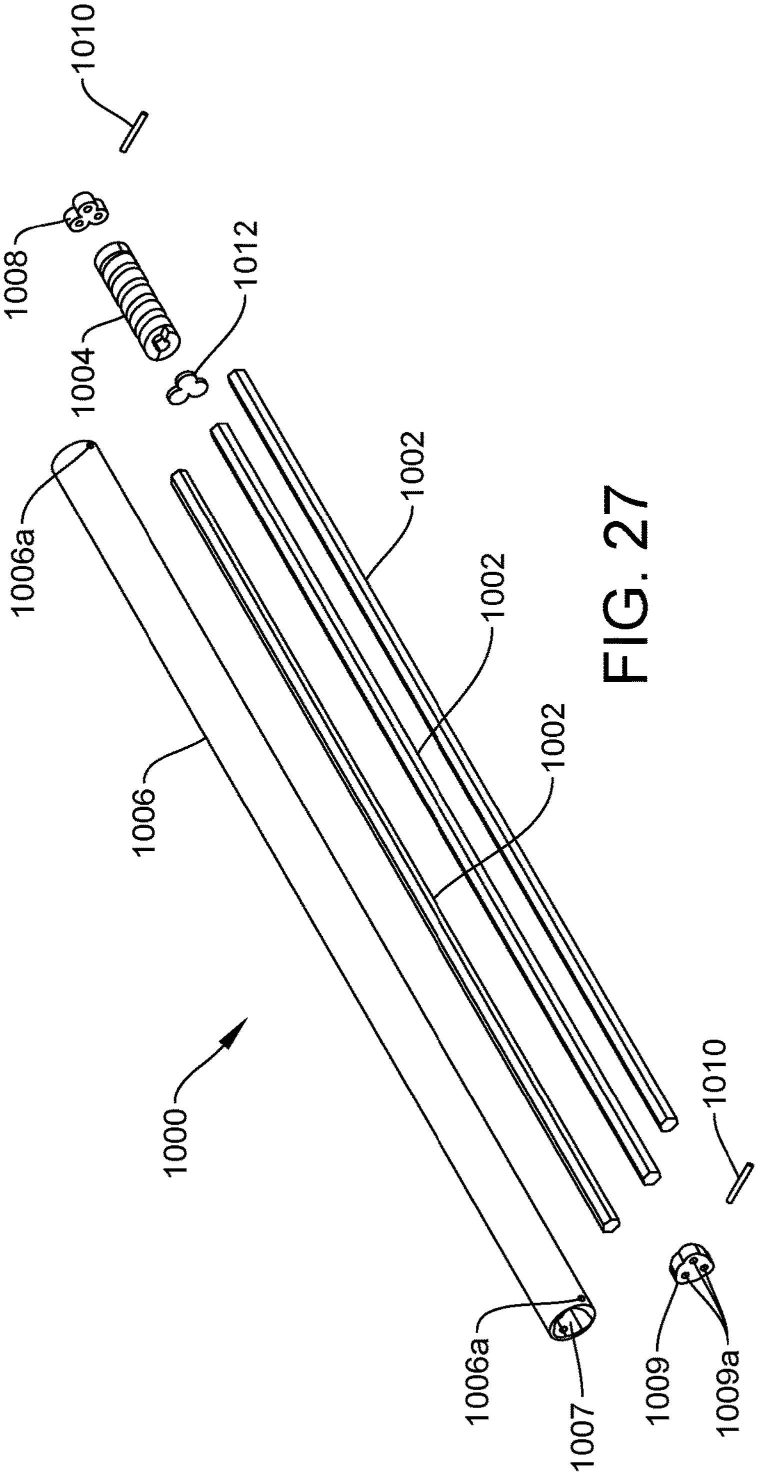
FIG. 27 is an exploded view of the compression bar of FIG. 25.

FIGS. 25-27 show an alternative embodiment of a compression bar 1000, that is similar to trilobe compression bar 300. Compression bar 1000 has a compression rod assembly that comprises three parallel compression rods 1002, a spring 1004 positioned at one end of the compression rods, and a compression plate 1012 positioned between the compression rods and spring. The compression rod assembly is positioned within the interior space 1007 of a hollow casing or tube 1006. As best shown in FIG. 26, interior space 1007 has a cross-section that is a compound of a circle and the trilobed cross-section of interior space 306*a*. The trilobe shape has the same configuration as interior space 306*a*, with each rod 1002 positioned in a separate lobe 1007*a*. The circle 1007*b* is sized to receive spring 1004.

Trilobed end plugs 1008 and 1009 are sized and shaped to fit within interior space 1007 and are positioned at the opposite ends of casing 1006, adjacent to spring 1004 at one end and rods 1002 at the other end. Corresponding openings are formed at the ends of casing 1006 (openings 1006*a*) and in end plugs 1008 and 1009 (not shown) for receiving pins 1010 to secure the end plugs in position and retain the compression rod assembly under compression. End plugs 1008 and 1009 may have either a trilobe shape similar to end plugs 308 (e.g., end plug 1008) or the compound shape of interior space 1007 (end plug 1009). Compression plate 1012 is similarly shaped to fit within interior space 1007, and may have either a trilobe shape or compound shape.

The single spring, trilobe design of compression bar 1000 allows spring 1004 to have a much larger outside diameter and wire diameter in comparison to springs 304 of compression bar 300. For example, spring 1004 may have an outside diameter of about 1 inch. This permits spring 1004 to exert greater compressive force on rods 1002, and increases the ability of compression bar 1000 to stop a cutting blade and self-heal. Similarly to end plugs 308, end plugs 1008 and/or 1009 may have threaded holes (e.g., 1009*a*) for receiving set screws (not shown) to adjust the compression of the compression rod assembly.

In some cases, forced entry is attempted by inserting a pry tool between the door and the frame. Hollow doors and frames may be susceptible to being bent or crushed to create sufficient space to force the end of the pry tool behind the end of the door and pry the door from the frame. Reinforcing plates (e.g., plates 410), may be attached to the door to increase resistance to bending or crushing. However, it would be desirable to protect the door from insertion of a pry tool between the door and frame. For example, an astragal may be used to protect against insertion of a pry tool between the lock side of the door and frame, as described above. However, a similar device does not exist for protecting the hinge side of the door.

Figure 29:
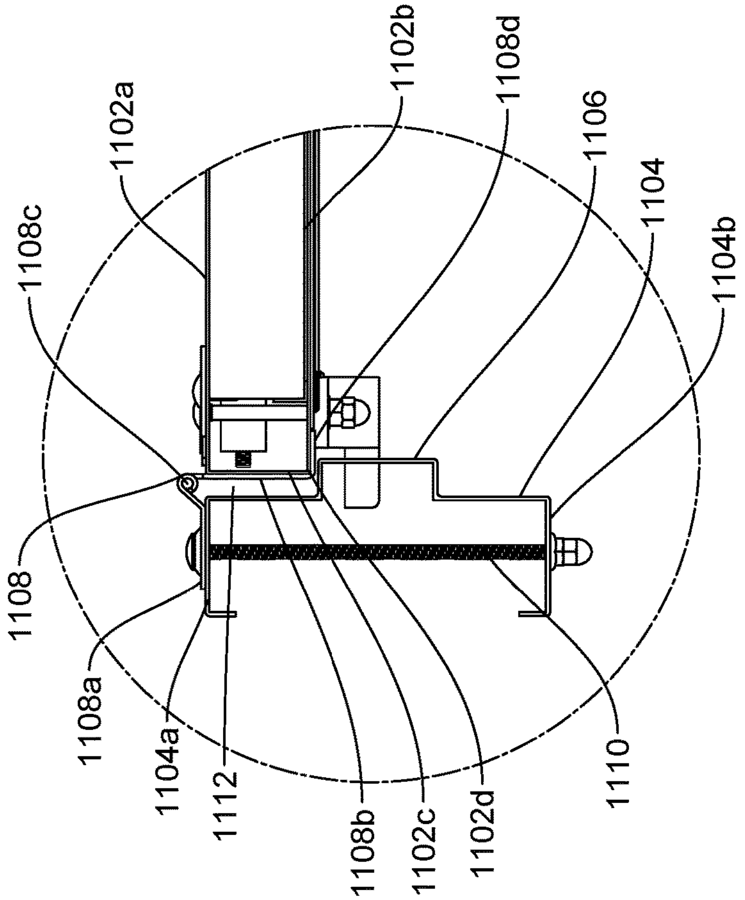
FIG. 29 is a top section, detail view of the door of FIG. 28, showing the hinge security bracket.
Figure 28:
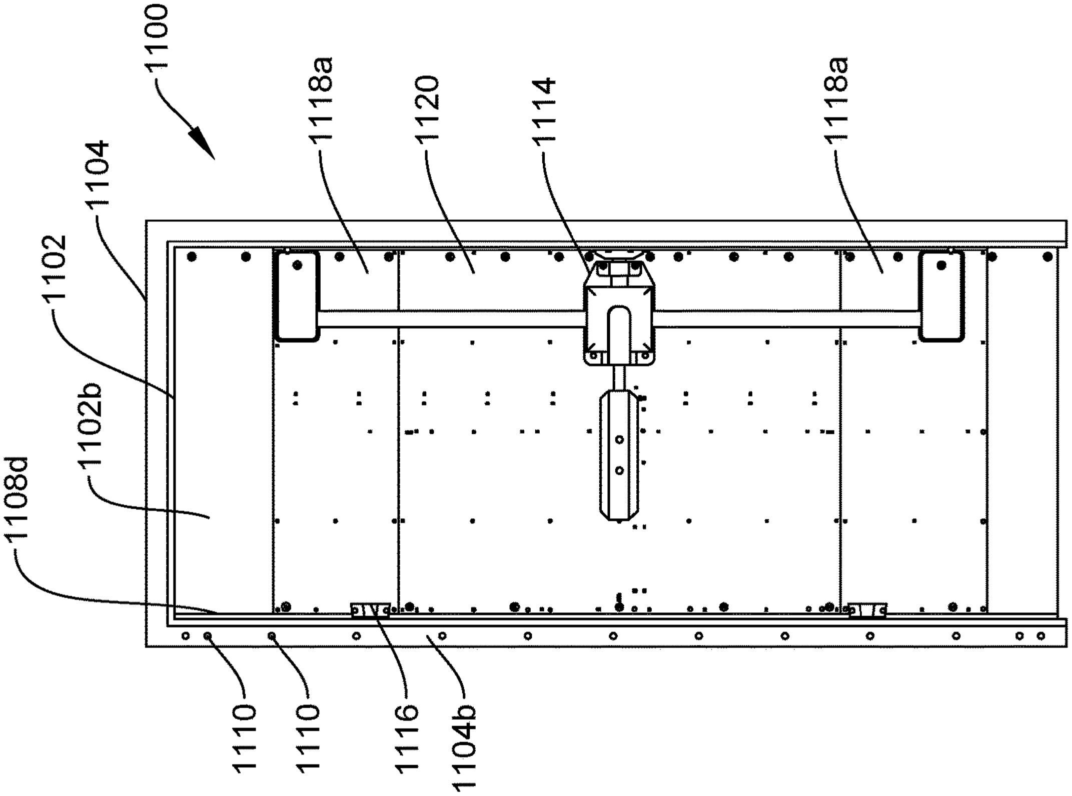
FIG. 28 is a rear elevation view of a door, showing the installation of an alternative embodiment of a hinge security bracket.

An alternative embodiment of a hinge bracket is shown in FIGS. 28 and 29. A door 1102 is mounted in a frame 1104 having a stop 1106. Door 1102 has an outer (exterior) surface or side 1102*a*, an inner (interior) surface or side 1102*b*, and an edge or end 1102*c* at the hinge side of the door. Frame 1104 similarly has an outer side 1104*a* and an inner side 1104*b*. A lock 1114 is typically mounted on the inner side 1102*b* of door 1002. One or more hinge bolts 1116 for securing the hinge side of door 1102 may also be mounted on inner side 1102*b* of the door, as are known in the art.

Door 1102 is hingedly mounted on frame 1104 by a hinge bracket 1108 having a length that preferably extends substantially the height of the door. Hinge bracket 1108 comprises a frame leaf 1108*a* and a door leaf 1108*b* that are rotatably coupled by a pin 1108*c*. Frame leaf 1108*a* is positioned on the outer surface 1104*a* of frame 1104, and is preferably sized and shaped to conform to and sit flush against the outer surface of the frame. Frame leaf 1108*a* (and hinge bracket 1108) may be secured to frame 1104 by bolts, screws, rivets, or other fasteners known in the art. In a preferred embodiment, frame leaf 1104*a* is secured to frame 1104 by a through bolt 1110 that extends through frame 1104 on either side 1104*a* and 1104*b*, as best shown in FIG. 29.

Door leaf 1108*b* is positioned on end 1102*c* of door 1102, within the space 1112 between the end of the door and frame 1104. Door leaf 1108*b* is preferably sized and shaped to conform to and sit flush against the outer surface of end 1102*c* of door 1102. In one embodiment, door leaf 1108*b* has a width that is greater than the width of end 1102*c* of door 1102, such that the end 1108*d* of the door leaf extends beyond end 1102*c* toward the inner surface 1102*b* of the door. In a preferred embodiment, door leaf 1108*b* is bent to conform to the corner 1102*d* between end 1102*c* and inner surface 1102*b* of door 1102, such that the door leaf (including end 1108*d*) sits flush against the end and inner surface of the door. Door leaf 1104*b* (and hinge bracket 1108) may be secured to end 1102*c* of door 1102 by bolts, screws, rivets, or other means known in the art that may be adapted to fit within the space between the end of the door and frame 1104.

In operation, hinge bracket 1108 extends across and covers the space 1112 between door 1102 and frame 1104, to protect against insertion of a pry tool between the hinge side of the door and frame. Door leaf 1108*b* is secured to and positioned flush against end 1102*c* of door 1102, to increase the difficulty in inserting a pry tool between hinge bracket 1008 and the door. Door leaf 1108*b* is bent to wrap around end 1102*c* of door 1102, and door leaf end 1108*d* is positioned flush against inner surface 1102*b* of the door, which further increases the difficulty of inserting a pry tool behind the end of the door to pry the door from the frame.

Figure 30:
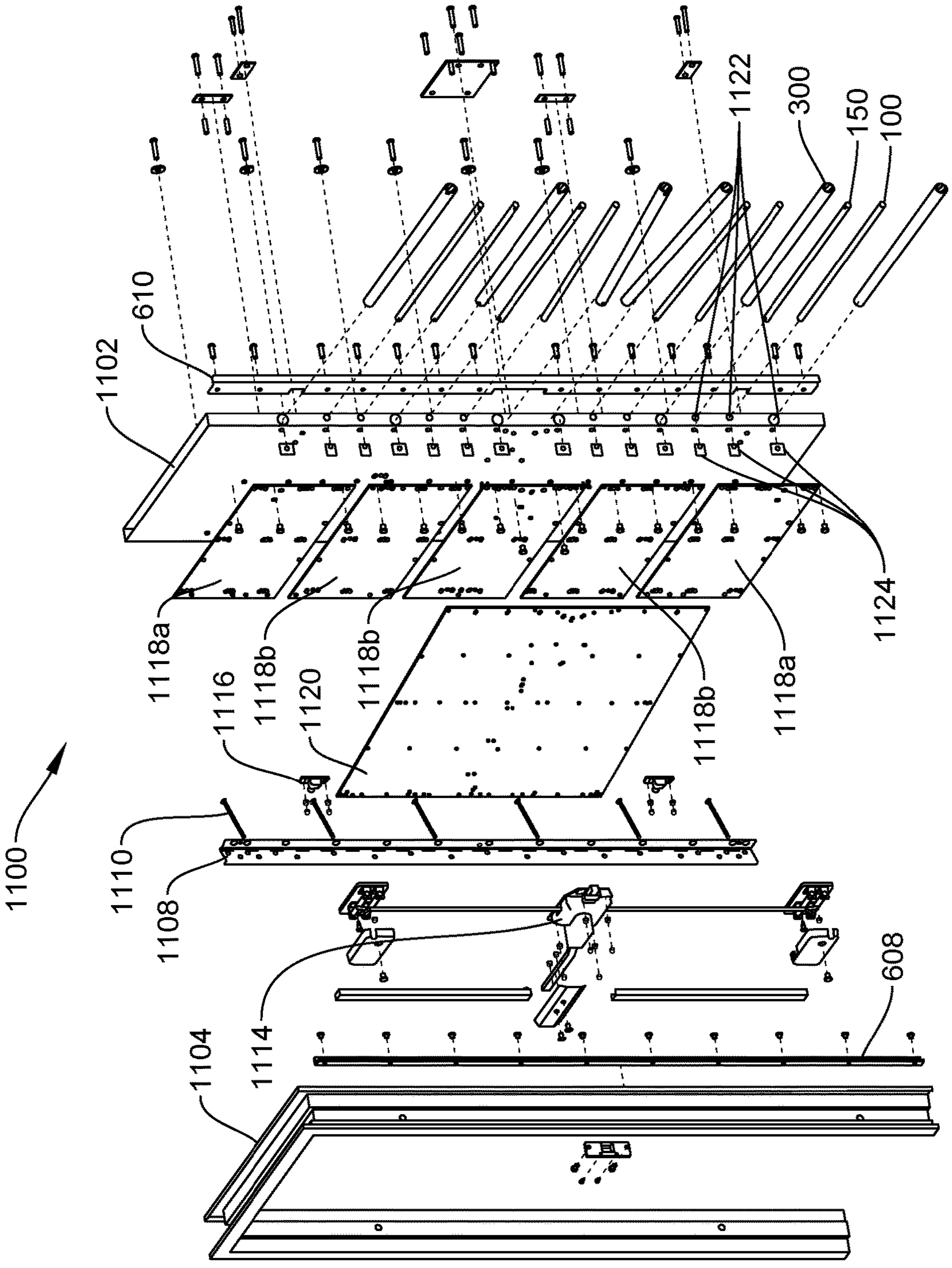
FIG. 30 is an exploded view of an alternative embodiment of a door security system, comprising the door of FIG. 28.

FIG. 30 shows an embodiment of a security door system 1100 that comprises hinge bracket 1108. Security door system 1100 is similar to the system 700 (FIG. 21), and may include an astragal (frame flange 608 and door flange 610) and compression bars (300, 150, 100), as described above. In one embodiment, door 1102 is hollow and is filled with a fire retardant material, such as a fire retardant foam.

Openings 1122 may be formed in the side of door 1102 for the insertion of compression bars 300, 150 and 100 within the hollow door, similarly to system 700. In one embodiment, compression bars 300, 150 and 100 may be supported within door 1102 by the fire retardant foam, without the need for compression bar brackets 404 and 406. Once compression bars 300, 150 and 100 are installed within door 1102, the openings 1122 may be covered by cover plates 1124, similarly to cover plates 408*a* and 408*b* described above. Alternatively, openings 1122 may be formed on end 1102*c* of door 1102, such that openings 1122 are covered when hinge bracket door leaf 1108*b* is secured to the end of the door.

In one embodiment, one or more anti-drill plates 1118*a* and/or 1118*b* may be attached to door 1102 to improve resistance to drilling, similarly to plates 410 described above. Plates 1118*a* and 1118*b* may be made of different materials with different properties (e.g., hardness and toughness). For example, plates 1118*a* positioned at the top and bottom of the door, which are at lower risk of attack, may be made of materials with greater impact strength (e.g., aluminum alloys). Plates 1118*b* positioned near the lock may be made of drill-resistant materials (e.g., hardened steel). The impact strength of drill-resistant plates 1118*b* may be improved by positioning one or more additional plates 1120 over plates 1118*b*. For example, plates 1118*b* may be sandwiched between plates 1120 and door 1102. In a preferred embodiment, plates 1120 and 1118*a* are made of the same impact resistant material.

Figure 31:
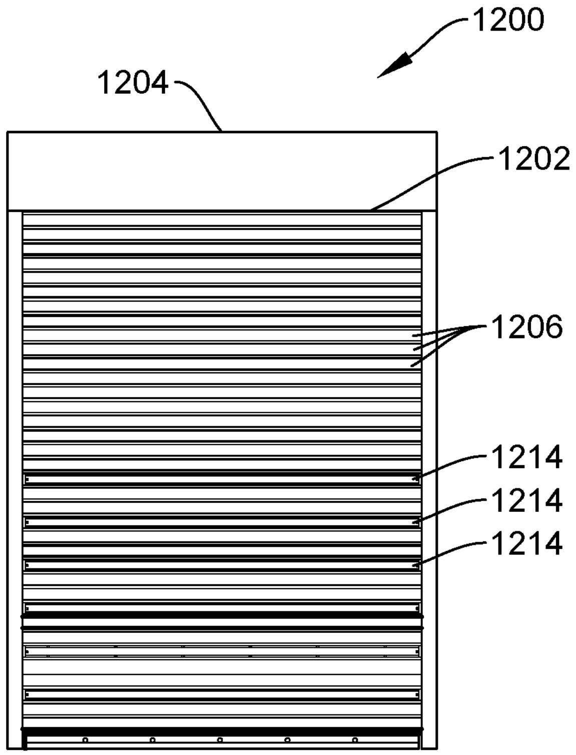
FIG. 31 is a rear elevation view of an embodiment of a security system comprising a rolling door and compression bar.
Figure 32:
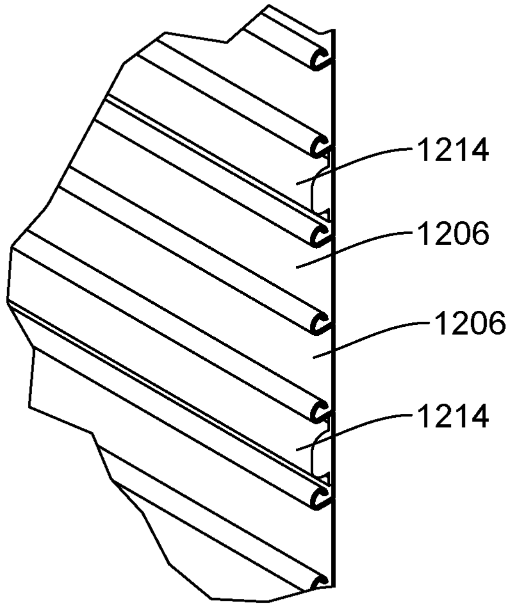
FIG. 32 is an detail, orthographic view of the rolling door of FIG. 31.
Figure 33:
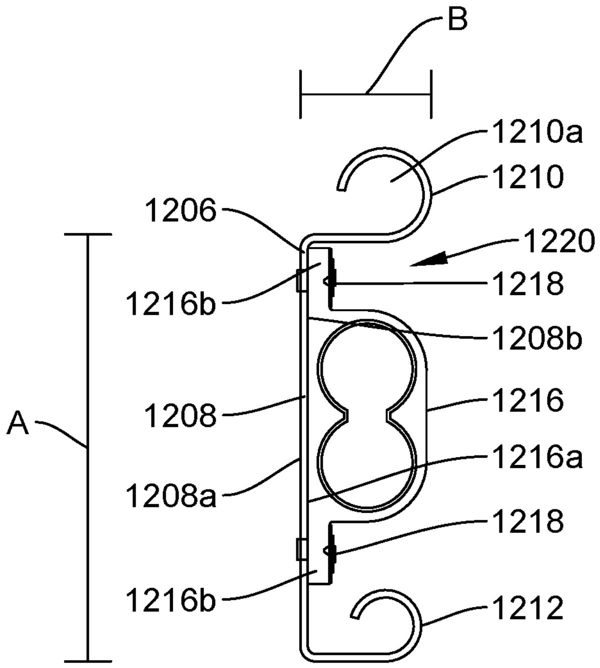
FIG. 33 is a side section view of a slat and compression bar of the rolling door of FIG. 31.

Referring to FIGS. 31-33, an embodiment of a security door system comprising a rolling door is shown. Security door system 1200 comprises a rolling door 1202 in a frame 1204. Rolling door 1202 may be extended to cover the opening of frame 1204 (FIG. 31), or may be retracted to allow access to the opening (e.g., by winding about a spindle). Rolling door 1202 is comprised of multiple articulated slats 1206, each slat having a body 1208 with an outer (exterior) side 1208*a* and an inner (interior) side 1208*b*. A receiving track 1210 and an engaging track 1212 are positioned at opposite ends of the body. Receiving track 1210 is sized and shaped to articulatingly receive an engaging track 1212 of another slat. In the embodiment shown in FIG. 33, engaging track 1212 forms a generally cylindrical shape, and receiving track 1210 forms an open loop with an interior space 1210*a* that is sized and shaped to receive the cylindrical portion of an engaging track. The engaging track 1212 of a first slat is received in the receiving track interior space 1210*a* of a second slat to form an articulating joint between the two slats.

A compression bar 1214 is coupled to one or more slats 1206 to improve the cut resistance of security door system 1200. Multiple compression bars 1214 may be distributed across the slats of rolling door 1202, or may be limited to those slats that are at highest risk of attack. For example, compression bars 1214 may be positioned on alternating slats that comprise the lower half of rolling door 1202, as best shown in FIG. 31.

Compression bars 1214 may be coupled to inner side 1208*b* of slat body 1208, and are preferably configured to conform to the inner side of the slat. In the embodiment of FIG. 33, slat body 1208 has a flat (planar) inner surface 1208*b*. Compression bar 1216 has a configuration similar to compression bar 200 described above, with a bottom surface 1216*a* that is configured to confirm to slat inner side 1208*b*. In one embodiment, compression bar 1216 has flanges 1216*a* for attachment of fasteners 1218 to couple the compression bar to slat 1206, or to provide additional surface area for an adhesive. Fasteners 1218 may be any suitable fastener known in the art, including screws, bolts, and rivets.

In a preferred embodiment, slat 1206 and compression bar 1214 are configured such that the compression bar does not interfere with the process of retracting rolling door 1202—e.g., by increasing the diameter of the wound rolling door 1202 in the retracted position. In the embodiment of FIG. 33, slat 1206 forms a generally U-shaped channel 1220 that opens toward the inner side of the slat. The base of channel 1220 is defined by the height A of slat 1206, and the arms of the channel are defined by the widths B of receiving track 1210 and engaging track 1212. Compression bar 1214 is sized and shaped to fit within channel 1220—i.e. has a height less than or equal to height A, and a width less than or equal to width B. Those of skill in the art will appreciate that security system 1200 is not limited to a door, and that alternative embodiments of compression bar 1216 may be adapted or otherwise modified for use in a rolling shutter or similar security system that comprises slats having the same generally U-shaped configuration as slat 1206.

It will be apparent to those of skill in the art that changes and modifications may be made in the embodiments illustrated herein, without departing from the spirit and scope of the invention.

What is claimed is:

1. A security system for a door, comprising:

a door having a vertical height, a horizontal width, and inner and outer sides;

a first security bar coupled to the door, comprising:

a hollow first casing having a first interior space with a first longitudinal axis; and a first rod and a first spring positioned in the first interior space, the first rod extending parallel to the first longitudinal axis, and the first spring positioned to exert compressive force on the first rod in a direction parallel to the first longitudinal axis; and a second security bar coupled to the door, comprising:

a hollow second casing having a second interior space with a second longitudinal axis;

a second rod and a second spring positioned in the second interior space, the second rod extending parallel to the second longitudinal axis, and the second spring positioned to exert compressive force on the second rod in a direction parallel to the second longitudinal axis; and a third security bar coupled to the door, comprising:

a hollow third casing having a third interior space with a third longitudinal axis; and a plurality of third security bar rods and a plurality third security bar springs positioned in the third interior space, including third and fourth rods and third and fourth springs, the third rod extending parallel to the third longitudinal axis, the third spring positioned to exert compressive force on the third rod in a direction parallel to the third longitudinal axis, the fourth rod positioned parallel to the third rod, and the fourth spring positioned to exert compressive force on the fourth rod in a direction parallel to the third longitudinal axis;

wherein the first, second, and third longitudinal axes are substantially horizontal to the door, the first and second springs do not overlap with respect to a plane vertical to the door, and the plurality of third security bar springs does not include two springs that overlap with respect to a plane perpendicular to the third longitudinal axis.

2. The security system of claim 1, wherein the door is hollow and has a door interior space, and wherein the first, second, and third security bars are positioned in the door interior space.

3. The security system of claim 2, further comprising first, second, and third brackets coupled to the door and extending into the door interior space, the first security bar positioned in the door interior space on the first bracket, the second security bar positioned in the door interior space on the second bracket, and the third security bar positioned in the door interior space on the third bracket.

4. The security system of claim 2, further comprising a plate secured to the inner side of the door.

5. The security system of claim 1, wherein the door has a first end hingedly coupled to a frame, the door having a closed position wherein the door is disposed in the frame with a first space between the first end and the frame, the security system further comprising:

a hinge bracket comprising a frame leaf and a door leaf rotatably coupled by a pin, the frame leaf secured to the frame and the door leaf secured to the first end of the door, and wherein the hinge bracket extends across the first space.

6. The security system of claim 5, wherein the frame has inner and outer sides, and the frame leaf is secured to the frame by a bolt extending through the frame inner and outer sides.

7. The security system of claim 5, wherein the door leaf extends from the first end to the inner side of the door.

8. The security system of claim 7, wherein the door leaf conforms to the first end and inner side of the door.

9. A security system for a door, comprising:

a hollow door having a vertical height, a horizontal width, inner and outer sides, and a door interior space;

a first security bar coupled to the door, comprising:

a hollow first casing having a first interior space with a first longitudinal axis; and a first rod and a first spring positioned in the first interior space, the first rod extending parallel to the first longitudinal axis, and the first spring positioned to exert compressive force on the first rod in a direction parallel to the first longitudinal axis; and a second security bar coupled to the door, comprising:

a hollow second casing having a second interior space with a second longitudinal axis; and a second rod and a second spring positioned in the second interior space, the second rod extending parallel to the second longitudinal axis, and the second spring positioned to exert compressive force on the second rod in a direction parallel to the second longitudinal axis;

a first plate secured to the inner side of the door; and first and second brackets coupled to the door, the first bracket having a first arm extending into the door interior space, the first security bar positioned in the door interior space on the first bracket arm, and the second bracket having a second arm extending into the door interior space, the second security bar positioned in the door interior space on the second bracket arm;

wherein the first and second longitudinal axes are substantially horizontal to the door, and the first and second springs do not overlap with respect to a plane vertical to the door; and wherein the first plate has a plurality of holes that are sized and shaped to receive the first and second arms, the holes arranged in a predetermined pattern to position the first and second arms in the door interior space.

10. A security system for a door, comprising:

a door having a vertical height, a horizontal width, inner and outer sides;

a first security bar coupled to the door, comprising:

a hollow first casing having a first interior space with a first longitudinal axis; and a first rod and a first spring positioned in the first interior space, the first rod extending parallel to the first longitudinal axis, and the first spring positioned to exert compressive force on the first rod in a direction parallel to the first longitudinal axis; and a second security bar coupled to the door, comprising:

a hollow second casing having a second interior space with a second longitudinal axis; and a second rod and a second spring positioned in the second interior space, the second rod extending parallel to the second longitudinal axis, and the second spring positioned to exert compressive force on the second rod in a direction parallel to the second longitudinal axis;

a first plate secured to the inner side of the door; and a second plate secured to the inner side of the door, the first and second plates made of different materials wherein the first and second longitudinal axes are substantially horizontal to the door, and the first and second springs do not overlap with respect to a plane vertical to the door.

11. The security system of claim 10, wherein the first plate is sandwiched between the second plate and the door.

* * * * *